(12) United States Patent
Togashi et al.

(10) Patent No.: US 7,529,942 B2
(45) Date of Patent: May 5, 2009

(54) TIME PROOF SERVER, TERMINAL, AND TIME PROVING METHOD

(75) Inventors: Masataka Togashi, Tokyo (JP); Kazuya Miyazaki, Tokyo (JP); Tsugihiko Ono, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/584,312

(22) PCT Filed: Oct. 27, 2004

(86) PCT No.: PCT/JP2004/015896
§ 371 (c)(1),
(2), (4) Date: Jun. 23, 2006

(87) PCT Pub. No.: WO2006/046285
PCT Pub. Date: May 4, 2006

(65) Prior Publication Data
US 2007/0118754 A1    May 24, 2007

(51) Int. Cl.
*H04L 9/00* (2006.01)
*G06F 15/16* (2006.01)
(52) U.S. Cl. .................. 713/178; 709/229; 709/248
(58) Field of Classification Search ............. None
See application file for complete search history.

(56) References Cited

U.S. PATENT DOCUMENTS

| | | | |
|---|---|---|---|
| 6,415,154 B1 * | 7/2002 | Wang et al. | 455/456.1 |
| 7,200,682 B2 * | 4/2007 | Miyazaki et al. | 709/248 |
| 7,266,685 B1 * | 9/2007 | Meandzija et al. | 713/156 |
| 7,321,776 B2 * | 1/2008 | Camp et al. | 455/456.1 |
| 2003/0212828 A1 * | 11/2003 | Miyazaki et al. | 709/248 |
| 2005/0094178 A1 * | 5/2005 | Anno | 358/1.13 |

FOREIGN PATENT DOCUMENTS

| | | |
|---|---|---|
| JP | 2001-297062 | 10/2001 |
| JP | 2002-215825 | 8/2002 |
| JP | 2003-198539 | 7/2003 |

OTHER PUBLICATIONS

Miyazaki, Kazuya et al., "Secure Storage-Application to Electronic Medical Chart", Mitsubishi Denki Giho, vol. 75, No. 2, pp. 38-40, 2001. (with English Translation).

Miyazaki, Kazuya et al., "Signature and Timestamp in Electronic Document", Mitsubishi Denki Giho, vol. 76, No. 4, pp. 47-50, 2002. (with English Translation).

* cited by examiner

*Primary Examiner*—Christian LaForgia
(74) *Attorney, Agent, or Firm*—Oblon, Spivak, McClelland, Maier & Neustadt, P.C.

(57) ABSTRACT

A time certification server includes a receiving section that receives an issue request for a time certification code and terminal information; a temporal change information input section that inputs temporal change information; a first code generating section that generates a first code based on the temporal change information and outputs the first code; a second code generating section that generates a second code based on the terminal information and the first code and outputs the second code; a transmitting section that transmits the second code to the terminal apparatus as a time certification code; a time certification code memory section that stores the time certification code in correlation with time; and a certification processing section that searches the time certification code memory section by using the time certification code received, thereby obtaining time, and outputs certification information based on the time obtained to the terminal apparatus.

16 Claims, 22 Drawing Sheets

TIME PROOF SERVER, TERMINAL, AND TIME PROVING METHOD

TECHNICAL FIELD

The present invention relates to a time certification server and a terminal apparatus that are included in a system that certifies the authenticity of time on terminal information from the terminal apparatus. The authenticity of the time is certified by recording the terminal information together with the time and information that can prove the time. The present invention also relates to a time certification method by the time certification server and the terminal apparatus, a time certification program for causing a computer to implement the time certification method, and a storage medium that has stored therein the time certification program.

BACKGROUND ART

Conventionally, stamping (i.e., displaying or printing) of date and time (hereinafter referred to as "time" as a generic term for date and time) of production on a product is done in order to specify when the product was produced. Simply stamping time on a product, however, is not enough to prove whether it is true or not that the product was produced at the time stamped thereon.

As a solution to this problem, Patent Document 1 proposes a system and method for certifying the authenticity of stamped time. According to this document, time and temporal change information specified by the time (e.g., weather information released at the time) are combined to generate combined information. The combined information is then stamped on a product. Stamped combined information makes it possible to certify the date and time of production of the product at a later time.

Patent Document 1: Unexamined Patent Publication No. 2001-297062

DISCLOSURE OF THE INVENTION

Problems to be Solved by the Invention

With the proposed system and method, however, the reliability of certification will be further improved by adding technologies on such as data compression, position measurement, data concatenation, condition setting, and diversification of temporal change information. Given that fact, it is an object of the present invention to further improve the reliability of certification by the proposed system and method by providing additional technologies such as those introduced.

Means to Solve the Problems

A time certification server may include the following: a receiving section that receives from a terminal apparatus an issue request for a time certification code and terminal information relating to the terminal apparatus; a temporal change information input section that inputs temporal change information; a first code generating section that generates a first code by encoding the temporal change information inputted by the temporal change information input section, and outputs the first code; a second code generating section that generates a second code based on the terminal information received at the receiving section and the first code outputted from the first code generating section, and outputs the second code; a transmitting section that transmits to the terminal apparatus the second code outputted from the second code generating section as a time certification code; a time certification code memory section that stores the time certification code transmitted from the transmitting section in correlation with time; and a certification processing section that receives the time certification code from the terminal apparatus, searches the time certification code memory section by using the time certification code received, thereby obtaining time correlating with the time certification code, and outputs certification information based on the time obtained to the terminal apparatus.

The code generated by the first code generating section is called a complete code. The complete code includes a hash value of a weather image, terminal information, time information, and a tamper detection code. The tamper detection code is a keyed hash value of a concatenated value of the hash value of a weather image, the terminal information, and the time information. The tamper detection code is otherwise a digital signature value or the like. The data size of the complete code, which is not to be defined, is often in a range of 256 to 512 bytes.

The code generated by the second code generating section is called a reference code. The reference code includes the hash value of the complete code or part thereof and additional information such as the terminal information. The additional information may include the serial numbers of the complete code and the reference code. The data size of the reference code is in a range of 12 bytes to tens of bytes.

The following are possible methods of information correlation used when the time certification code memory section stores the time certification code:

(1) storing the reference code and the complete code in correlation with each other;

(2) storing a terminal ID in correlation with the reference code, and with the complete code; and (3) storing the reference code in correlation with the serial number thereof and the complete code in correlation with the serial number thereof.

Effect of the Invention

According to this invention, time is stored in correlation with the time certification code, which is compressed information including the terminal information received from the terminal apparatus and the temporal change information. This makes it possible to retrieve the time by using the time certification code, and publish the time as certification information to certify the authenticity of the time about the terminal information.

BEST MODE FOR CARRYING OUT THE INVENTION

Embodiment 1

A first embodiment describes a case of compressing data using a hash function to generate combined information based on time to be certified and weather information as temporal change information.

FIG. 1 is an external view of a terminal apparatus and a time certification server according to the first embodiment.

With reference to FIG. 1, the terminal apparatus and the time certification server each are equipped with a system unit 910, a display unit 901, a keyboard (K/B) 902, a mouse 903, a compact disc drive (CDD) 905, a printer unit 906, and a scanner unit 907, which are connected by cables.

The terminal apparatus and the time certification server are connected to a facsimile machine 932 and a telephone set 931 by cables. The terminal apparatus and the time certification server are also connected to the Internet 940 over a local area network (LAN) 942 and a web server 941.

FIG. 2 is a diagram illustrating a hardware configuration of the terminal apparatus and the time certification server of the first embodiment when implemented by computer.

With reference to FIG. 2, the terminal apparatus and the time certification server each are equipped with a central processing unit (CPU) 911 for executing programs. The CPU 911 is connected to a read only memory (ROM) 913, a random access memory (RAM) 914, a communication board 915, the display unit 901, the keyboard (K/B) 902, the mouse 903, a flexible disc drive (FDD) 904, the compact disc drive (CDD) 905, the printer unit 906, the scanner unit 907, and a magnetic disc drive 920 via a bus 912.

The RAM 914 is a type of volatile memory. The ROM 913, the FDD 904, the CDD 905, the magnetic disc drive 920, and an optical disc drive are types of nonvolatile memories. These are examples of memory units or memory sections.

The communication board 915 is connected to the telephone set 931, the facsimile machine 932, the LAN 942, etc. The communication board 915, the K/B 902, the FDD 904, and the scanner unit 907 are examples of receiving sections or input sections. The communication board 915 and the display unit 901 are examples of transmitting sections or output sections.

It is also possible that the communication board 915, instead of connected to the LAN 942, is connected directly to the Internet 940 or a wide area network (WAN) such as ISDN. When the communication board 915 is connected directly to the Internet 940 or a WAN such as ISDN, the terminal apparatus and the time certification server are connected to the Internet 940 or the WAN such as ISDN. The web server 941 thus becomes redundant.

The magnetic disc drive 920 stores an operating system (OS) 921, a window system 922, a program group 923, and a file group 924. The program group 923 is executed by the CPU 911, the OS 921, and the window system 922.

The program group 923 stores programs for executing functions, each referred to as a "section" in the first embodiment through the fifth embodiment, which will be discussed hereinafter. The programs are read and executed by the CPU 911.

The file group 924 stores information, codes, and time that are generated in the first embodiment through the fifth embodiment, which will be discussed hereinafter, as files.

Arrows shown in flowcharts discussed hereinafter in the first embodiment through the fifth embodiment mainly indicate data input/output. For the data input/output, data is stored in any other storage medium, such as the magnetic disc drive 920, a flexible disc (FD), an optical disc, a compact disc (CD), a mini disc (MD), or a digital versatile disc (DVD). Data is otherwise transmitted through a signal line or any other transmission medium.

An element referred to as a "section" in the first embodiment through the fifth embodiment discussed hereinafter may be implemented by firmware stored in the ROM 913. The element may alternatively be implemented by software alone, hardware alone, a combination of software and hardware, or a combination of software, hardware and firmware.

Programs for executing the first embodiment through the fifth embodiment discussed hereinafter may be stored by using any other storage unit, such as the magnetic disc drive 920, the flexible disc (FD), the optical disc, the compact disc (CD), the mini disc (MD), or the digital versatile disc (DVD).

A brief description is now given of a case where the terminal apparatus and the time certification server of the present invention are implemented in a computer system that is shown in FIG. 1 and FIG. 2. First, the following is assumed: the computer system shown in FIG. 1 and FIG. 2 is started and the OS is running. Programs for implementing the terminal apparatus and the time certification server are stored in the magnetic disc drive 920 and the ROM 913. For the programs to be executed, the OS reads and stores them in the RAM 914 or the like. Read programs are then executed sequentially. The execution of the programs on a computer is a matter that one skilled in the art can easily understand and use. Therefore, it is not the essence of this embodiment, and will not be discussed in any more detail.

The hardware configuration of the terminal apparatus and the time certification server when implemented by computer is also applicable to the same implementation of the terminal apparatus and the time certification server in the following embodiments.

FIG. 3 is a diagram illustrating the configuration of a system that carries out time certification according to the first embodiment.

The system includes a terminal apparatus 200 that requests time certification, a time certification server 100 that carries out the time certification requested, a communication network 300 that connects the terminal apparatus 200 and the time certification server 100, and a weather information center 400 that is equipped with a server for providing weather information received from a weather satellite 410.

The terminal apparatus 200 transmits an issue request for a time certification code together with terminal information to be certified to the time certification server 100 over the communication network 300. The time certification server 100, upon receipt of the terminal information and the issue request for the time certification code, transmits to the terminal apparatus 200 time and the time certification code that is required to certify the time about the terminal information. The terminal apparatus 200 receives and stores therein the time certification code and the time. The terminal apparatus 200 transmits a previously received time certification code to the time certification server 100 in the case of certifying the authenticity of the terminal information at a later time. The time certification server 100, upon receipt of the time certification code, stamps the time certification code on a product. A receiving terminal or other terminals generate the certification information of the terminal information based on the time certification code, and transmit the certification information to the terminal apparatus 200. The terminal apparatus 200 certifies the authenticity of the terminal information by using the certification information received.

A description is now given of a configuration of the time certification server 100. FIG. 4 is a diagram illustrating a functional configuration of the time certification server 100.

The time certification server 100 is configured to include: a receiving section 101 that receives from a terminal apparatus 200 an issue request for a time certification code and terminal information relating to the terminal apparatus 200; a temporal change information input section 102 that inputs temporal change information; a first code generating section 103 that generates a first code by encoding the temporal change information inputted by the temporal change information input section 102, and outputs the first code; a second code generating section 104 that generates a second code based on the terminal information received at the receiving section 101 and the first code outputted from the first code generating section 103, and outputs the second code; a transmitting section 105 that transmits to the terminal apparatus 200 the second code outputted from the second code generating section 104 as a time certification code; a time certification code memory section 106 that stores the time certification code transmitted from the transmitting section 105 in correlation with time; and a certification processing section 107 that receives the time certification code from the terminal apparatus 200, searches the time certification code memory section 106 by using the time certification code received, thereby obtaining time correlating with the time certification code, and outputs certification information based on the time obtained to the terminal apparatus 200. The time certification server 100 is also configured to include a server electronic clock 108 that provides time for the time certification code memory section 106.

The following are possible methods of information correlation used when the time certification code memory section 106 stores the time certification code:
(1) storing the reference code and the complete code in correlation with each other;
(2) storing a terminal ID in correlation with the reference code, and with the complete code; and
(3) storing the reference code in correlation with the serial number thereof and the complete code in correlation with the serial number thereof.

The receiving section 101 receives the terminal information including terminal identification information (terminal ID) that is transmitted by the terminal apparatus 200 over the communication network 300. The receiving section 101 also receives the issue request for the time certification code to the time certification server 100. The receiving section 101 then starts generating the time certification code in response to the received issue request for the time certification code. The receiving section 101 then transmits the received terminal information to the second code generating section 104, which will be described later in detail.

The terminal information includes the terminal identification information (terminal ID: Identifier) of the terminal apparatus 200, user identification information of the terminal apparatus 200, contract identification information, and the like in addition to the time to be certified. The terminal information is to be implemented as the information that can be generated only by the terminal apparatus, or only by the terminal apparatus and the time certification server, or the information that is not exchangeable due to encryption.

The time certification code is generated based on the terminal information received at the receiving section 101 and the weather information received from the weather satellite 410. A generated time certification code is transmitted to the terminal apparatus 200, and also stored therein in correlation with time. This makes it possible to certify the authenticity of time about information to be certified, which is included in the time certification code, by using the time certification code at a later time.

The temporal change information input section 102 inputs the temporal change information including the weather information from a server of the weather information center 400, and transmits the temporal change information to the first code generating section 103.

The first code generating section 103, as shown in FIG. 5, generates digital information such as bitmap data by encoding the temporal change information including the weather information received from the temporal change information input section 102. The first code generating section 103 then performs a first hash generation of the bitmap data generated by using the hash function, thereby generating a hash value and obtaining the complete code (an example of the first code). The first code generating section 103 then transmits the complete code to the second code generating section 104. The bitmap data is then compressed to as small as 20 bytes to 64 bytes by obtaining the hash value thereof by using the hash function.

The second code generating section 104, as shown in FIG. 5, performs a second hash generation of the complete code received from the first code generating section 103 by adding the terminal information including the terminal identification information (terminal ID) received from the receiving section 101, thereby generating a hash value and obtaining the reference code (an example of the second code). The second code generating section 104 then transmits the reference code to the transmitting section 105 as the time certification code.

As aforementioned, the terminal information includes the user ID of a user of the terminal apparatus 200, the position information about the position where the terminal apparatus 200 is located, and the like. Therefore, the second code generated by the second code generating section 104 is a code unique to the terminal apparatus 200 or a code unique to the user of the terminal apparatus.

Like the first code generating section 103, when the second code generating section 104 obtains a hash value of the terminal information and the first code by using the hash function, data is also compressed to as small as around 20 bytes, for example. A compressed second code will be referred to also as the reference code.

The transmitting section 105 transmits the second code received from the second code generating section 104 to the terminal apparatus 200 over the communication network 300 as the time certification code. The transmitting section 105 also transmits the second code to the time certification code memory section 106.

The time certification code memory section 106 stores the time certification code received from the transmitting section and time that is outputted by the server electronic clock 108 on an as-needed basis in correlation with each other. The time certification code memory section 106 also stores the terminal information of the terminal apparatus 200 in correlation with the time certification code.

The following are possible methods of information correlation used when the time certification code memory section 106 stores the time certification code:
(1) storing the reference code and the complete code in correlation with each other;
(2) storing a terminal ID in correlation with the reference code, and with the complete code; and
(3) storing the reference code in correlation with the serial number thereof and the complete code in correlation with the serial number thereof.

Now, a description is given of a configuration of the terminal apparatus 200. FIG. 6 is a diagram illustrating a functional configuration of the terminal apparatus 200.

The terminal apparatus 200 that communicates with a time certification server 100 for time certification is configured to include: a time certification code issue requesting section 201 that transmits to the time certification server 100 an issue request for a time certification code and terminal information relating to the terminal apparatus, and a stamping section 202 that receives the time certification code from the time certification server 100, and prints time that is certified by the time certification code together with the time certification code. The terminal apparatus 200 is also configured to include a time certification code memory section 203 that stores the time certification code received from the time certification server 100.

FIG. 6 shows an example of displaying or writing the time of production of a product, such as an egg or something, on the product or on an IC tag. In this case, the time certification code issue requesting section 201 transmits an issue request for the time certification code to certify time to be displayed to the time certification server 100 together with the terminal information of the terminal apparatus 200. The terminal information includes the time to be certified. The stamping section 202 stamps the time certification code and the time received from the time certification server 100 in pairs on an egg, an IC tag or some kind of a product, as shown in FIG. 7. The time certification code memory section 203 stores the time certification code received from the time certification server 100 temporarily.

The terminal apparatus 200 further includes a time verification section 204 that inputs and transmits to the time certification server 100 the time certification code printed by the stamping section 202, and requests time certification, thereby verifying the authenticity of the time printed by the stamping section 202. Alternatively, however, the time verification section 204 may be independently provided in another terminal apparatus.

For example, the time verification section 204, in order to verify the authenticity of the time stamped on such as an egg, an IC tag, or some kind of a product, as shown in FIG. 7, operates as follows. The time verification section 204 may input the stamped time certification code and the stamped time from a keyboard. The time verification section 204 may then transmit the time certification code alone to the time certification server 100 over the communication network 300. The time verification section 204 may receive the certification information that is transmitted by the time certification server 100 upon receipt of the time certification code. The time verification section 204 may then check whether or not a previously inputted time and time included in the certification information match, and then displays the check result. Alternatively, it is also possible to transmit both the stamped time and the stamped time certification code to the time certification server 100, and receive the check result at the server as the certification information.

Alternatively, the time verification section 204 may operate as follows. The time verification section 204 inputs the stamped time certification code from the keyboard, and transmits the time certification code alone to the time certification server 100 via the communication network 300. The time verification section 204 then receives the certification information that is transmitted by the time certification server 100 upon receipt of the time certification code, and displays the time included in the certification information. In this case, the user of the terminal apparatus 200 must check to see if the stamped time and displayed time match by visual comparison.

With the first embodiment, the time certification code issue requesting section 201, the stamping section 202, the time certification code memory section 203, and the time verification section 204 are equipped in a single terminal. Alternatively, it is also possible to have different terminal apparatuses: one equipped with the time certification code issue requesting section 201, the stamping section 202, and the time certification code memory section 203, and another equipped with the time verification section 204.

Next, an operation of a time certification method using the time certification server 100 and the terminal apparatus 200 according to the first embodiment will be discussed.

A time certification method, which is performed by a time certification system that includes a terminal apparatus and a time certification server, may be described as follows: the terminal apparatus transmits an issue request for a time certification code and terminal information relating to the terminal apparatus to the time certification server; the time certification server receives from the terminal apparatus the issue request for the time certification code and the terminal information relating to the terminal, inputs temporal change information from a source device that provides the temporal change information, generates a first code by encoding the temporal change information, outputs the first code, generates a second code based on the terminal information and the first code, outputs the second code, transmits the second code to the terminal apparatus as a time certification code, and stores the time certification code in a time certification code memory section in correlation with time; the terminal apparatus transmits the time certification code to the time certification server and requests time certification; and the time certification server receives the time certification code from the terminal apparatus, and searches the time certification code memory section by using the time certification code received, thereby obtaining time correlating with the time certification code, and outputs to the terminal apparatus the certification information based on the time obtained.

The operation is now discussed specifically. The terminal apparatus 200 of a producer receives the time certification code to certify time from the time certification server 100. The terminal apparatus 200 of the producer then stamps the time certification code and time to be certified on a product, or the like. This operation is discussed first with reference to the flowchart of FIG. 8.

In preparation for stamping time on a product or the like, the time certification code issue requesting section 201 of the terminal apparatus 200 transmits the issue request for the time certification code and the terminal information including the terminal ID and the time to be certified to the time certification server 100 via the communication network 300 in order to certify the authenticity of the time to be stamped (Step S100).

The receiving section 101 of the time certification server 100 receives the issue request for the time certification code and the terminal information from the terminal apparatus 200 (Step S101). The temporal change information input section 102 of the time certification server 100 receives the weather information from the server of the weather information center 400 on an as-needed basis (Step S102). The first code generating section 103 of the time certification server 100 performs a first hash generation using the weather information at the time to be certified that is included in the terminal information based on the hash function, thereby thus generating the complete code (Step S103).

The code generated by the first code generating section 103 is called a complete code. The complete code includes a hash value of a weather image, terminal information, time information, and a tamper detection code. The tamper detection code is a keyed hash value of a concatenated value of the hash value of a weather image, the terminal information, and the time information. The tamper detection code is otherwise a digital signature value or the like. The data size of the complete code, which is not to be defined, is often in a range of 256 to 512 bytes.

The code generated by the second code generating section 104 is called a reference code. The reference code includes the hash value of the complete code or part thereof and additional information such as the terminal information. The additional information may include the serial numbers of the complete code and the reference code. The data size of the reference code is in a range of 12 bytes to tens of bytes.

The following are possible methods of information correlation used when the time certification code memory section 106 stores the time certification code:

(1) storing the reference code and the complete code in correlation with each other;
(2) storing a terminal ID in correlation with the reference code, and with the complete code; and
(3) storing the reference code in correlation with the serial number thereof and the complete code in correlation with the serial number thereof.

The second code generating section 104 of the time certification server 100 performs a second hash based on the complete code and the terminal information by using the hash function, and generates the reference code (Step S104). The transmitting section 105 transmits the generated reference code to the terminal apparatus 200 as the time certification code together with time generated by the server electronic clock 108 (Step S105). Then, the time certification code memory section 106 of the time certification server 100 stores the time certification code in correlation with the time generated by the server electronic clock 108 of the time certification server 100 (Step S106).

The terminal apparatus 200 receives from the time certification server 100 and stores in the time certification code memory section 203 the time certification code and the time (Step S107). The stamping section 202 stamps the time certification code and the time on a product or the like (Step S108).

The terminal apparatus 200 of a consumer who purchased the product transmits the time certification code stamped on the product to the time certification server 100. The terminal apparatus 200 of the consumer then receives time based on the time certification code from the time certification server 100, thereby checking the authenticity of the time stamped. This operation is discussed next with reference to the flowchart of FIG. 9.

The time verification section 204 of the terminal apparatus 200 receives an input of the time certification code that is stamped on the product from the consumer (Step S110). The time verification section 204 then transmits the time certification code to the time certification server 100 over the communication network 300 (Step S111).

The certification processing section 107 of the time certification server 100 receives the time certification code (Step S112). The certification processing section 107 then searches the time certification code memory section 106 using the received time certification code, and retrieves time and a terminal ID that correlate with the received time certification code (Step S113). The certification processing section 107 then generates the certification information (including time with this case) based on the time and terminal ID retrieved, and transmits the certification information to the terminal apparatus 200 (Step S114). Alternatively, the terminal information may include the certification information.

The time verification section 204 of the terminal apparatus 200 receives the certification information (Step S115). The time verification section 204 then compares between the time included in the certification information and the time stamped on the product, and outputs a result showing whether or not the stamped time is true. The time verification section 204 may otherwise output the time included in the certification information. Then, the consumer may compare between the outputted time and the stamped time, thereby checking the authenticity of the stamped time (Step S116). When the terminal information is included in the certification information, the terminal information may be used to display the terminal apparatus that generated the time certification code.

Thus, the time certification method may be implemented on a computer by describing the following processes as a time certification program: a receiving process that receives from a terminal apparatus an issue request for a time certification code and terminal information relating to the terminal; a temporal change information input process that inputs temporal change information; a first code generating process that generates a first code by encoding the temporal change information inputted by the temporal change information input process, and outputs the first code; a second code generating process that generates a second code based on the terminal information received by the receiving process and the first code outputted by the first code generating process, and outputs the second code; a transmitting process that transmits the second code outputted by the second code generating process to the terminal apparatus as a time certification code; a time certification code memory process that stores the time certification code transmitted by the transmitting process in correlation with time; and a certification process that receives the time certification code from the terminal apparatus, retrieves the time certification code stored by the time certification code memory process, acquires time that correlates with the time certification code, and outputs to the terminal apparatus certification information based on the time acquired. This time certification program may be recorded in a storage medium.

The operations of the time certification server 100 and the terminal apparatus 200 of the first embodiment may thus be described. Now, here are the effects of the first embodiment.

According to the first embodiment, it becomes possible to implement the time certification server that certifies the time that is requested by the terminal apparatus by using the temporal change information including the weather information.

According to the first embodiment, even if the weather information is image information that includes a large amount of data, data may be compressed by hashing. This makes it possible to minimize the amount of data of the time certification code used to certify time. Since the time certification code is a short reference code, the operation of the terminal apparatus may be simplified. Hashing using the hash function, which is a one-way function, makes it possible to incorporate the terminal information including the terminal identification information and the temporal change information including the weather information in an inseparable manner.

According to the first embodiment, it becomes possible to provide the terminal apparatus characterized as follows. The terminal apparatus requests the time certification server to certify time, and then stamps on a product or the like whose time of production is to be certified the certified time and the time certification code issued by the time certification server. The time certification code is generated from the temporal change information including the weather information.

According to the first embodiment, it becomes possible to provide the terminal apparatus characterized as follows. In order to certify time stamped on a product or the like, the terminal apparatus transmits the time certification code to the time certification server requesting to certify the time. The terminal apparatus then certifies the stamped time by using the certification information issued by the time certification server.

According to the first embodiment, it becomes possible to implement the time certification method in which the time certification server certifies the time that the terminal apparatus presents by using the time certification server and the terminal apparatus.

According to the first embodiment, the time certification method, if written into a program, may be recorded in a storage medium, and then implemented on a computer.

According to the first embodiment, with keyed hash including the terminal identification information or attachment of digital signature, it is possible to generate a different time certification code for each terminal apparatus or user, for example, even if the time is the same. Thus, fraudulent use of the time certification code may be prevented.

According to the first embodiment, for example, when the time certification code is written on an IC tag, greater flexibility can be achieved because a length restriction of written data is moderate on an IC tag. This allows additional information, such as Uniform Resource Locator (URL), the name of an object expecting the time certification code to be stamped thereon, the names of the country, prefecture, municipality thereof, and the like, to be written in the generated complete code. It is also possible to add information to be used for other systems.

According to the first embodiment, the terminal apparatus may transmit to the time certification server the terminal identification information, the user identification information, the contract identification information, and the like included in the terminal information. This makes it possible to check through authentication whether or not the terminal apparatus, its user, or its use contract is true.

Embodiment 2

A second embodiment describes a case of the terminal apparatus receiving positioning time information from a Global Positioning System (GPS) satellite, measuring the position of the terminal apparatus, and transmitting terminal information including terminal positioning information and positioning time information to the time certification server. To make the terminal positioning information more reliable, the terminal information transmitted by the terminal apparatus may include location-dependent information such as temperature, humidity, air pressure, and the like around the terminal apparatus.

FIG. 10 is a diagram illustrating the configuration of a system that implements time certification according to the second embodiment.

The configuration of the system of the second embodiment modifies that of the first embodiment by adding a GPS satellite 500 that transmits radio waves used by the terminal apparatus for measuring its position. The terminal apparatus 200 transmits the terminal positioning information and the positioning time information to the time certification server 100 in addition to the terminal identification information (terminal ID). The terminal apparatus 200 transmits information that is available at no other position than that specific position to the time certification server 100 in order to obtain the time certification code, thereby certifying the position where it is. In response, the time certification server 100 issues the time certification code that certifies, together with the time, the position where the terminal apparatus 200 exists.

FIG. 11 is a diagram illustrating a functional configuration of the time certification server 100 according to the second embodiment. The configuration of the time certification server 100 of the second embodiment modifies that of the first embodiment by adding certification time recording section 109 that records the positioning time information included in the terminal information and time outputted by the server electronic clock in the time certification code memory section 106.

The certification time recording section 109 records the positioning time information included in the terminal information received by the receiving section 101 from the terminal apparatus 200 and the time measured by the server electronic clock 108 in the time certification code memory section 106.

The receiving section 101 of the time certification server 100 receives from the terminal apparatus 200 the terminal information including the terminal positioning information and the positioning time information. The terminal positioning information is obtained by measuring the position of the terminal apparatus 200. More specifically, the terminal positioning information is obtained by the GPS satellite 500 measuring the position of the terminal apparatus 200 by using the GPS satellite 500. The positioning time information is obtained from a satellite electronic clock of the GPS satellite 500. To make the terminal positioning information more reliable, the receiving section 101 receives from the terminal apparatus the terminal information including the location-dependent information that is available for the terminal apparatus 200 to acquire at the position where the terminal apparatus 200 exists.

The second code generating section 104 of the time certification server 100 hashes the terminal information, which includes the terminal positioning information, and the temporal change information, thereby thus generating the second code. The second code generating section hashes the terminal information, which includes the location-dependent information and the temporal change information, thereby thus generating the second code.

The location-dependent information is supplemental information to make the terminal positioning information more reliable. The location-dependent information is available for the terminal apparatus 200 to acquire at no other position than the position where the terminal apparatus 200 exists. The location-dependent information is, for example, weather information such as temperature, humidity, and air pressure that are available at that particular time and position. When the terminal apparatus 200 is connected to the time certification server 100 via a base station of a mobile telephone or Personal Handy Phone (PHS: registered trademark) system, the position information of the base station is the location-dependent information. When the terminal apparatus 200 is transmitting data over the Internet, then the position information of the connected access router is the location-dependent information. When the terminal apparatus 200 is transmitting data via a telephone circuit, then information that is available for specifying a position where the terminal apparatus exists on such as a switch through which the circuit is routed, is the location-dependent information.

The server electronic clock 108 equipped in the time certification server 100 of the second embodiment is different from that of the first embodiment. The server electronic clock 108 of the second embodiment is synchronized with the satellite electronic clock that is equipped in the GPS satellite 500.

FIG. 12 is a diagram illustrating a functional configuration of the terminal apparatus 200 according to the second embodiment.

The configuration of the terminal apparatus 200 of the second embodiment modifies that of the first embodiment by adding a positioning section 205 that receives electronic waves from the GPS satellite 500 and measures the position of the terminal apparatus 200.

The positioning section 205 usually calculates the arrival time of an electronic wave based on time information included in electronic waves received from four or more GPS satellites 500, and measures the position of a terminal apparatus based on calculated arrival time. The received time information and measured position information are transmitted to the time certification code issue requesting section 201. The time certification code issue requesting section 201 transmits the received time information and the measured position information to the time certification server 100 as the positioning time information and position measurement information in the terminal information, respectively. It is also possible to transmit information that is included in electronic waves received from two or more GPS satellites 500 directly to the time certification server 100.

Now, operations of the time certification server 100 and the terminal apparatus 200 of the second embodiment are discussed specifically with reference to the flowchart of FIG. 13.

The positioning section 205 of the terminal apparatus 200 receives electronic waves from the GPS satellite 500, and measures the position of the terminal apparatus 200 (Step S200). The terminal apparatus 200 transmits the terminal information to the time certification server 100 together with the issue request for the time certification code (Step S201). The terminal information may include the terminal positioning information that is obtained by measuring the position, the positioning time information included in the electronic waves received from the GPS satellite 500, and the terminal identification information (terminal ID).

The time certification server 100 receives from the terminal apparatus the terminal information including the terminal positioning information and the positioning time information and the issue request for the time certification code (Step S202). The time certification server 100 then hashes the terminal information including the terminal positioning information and the positioning time information, and the temporal change information including the weather information, thereby thus generating the second code (Step S203).

Operations in subsequent steps Step S204 through Step S207 are the same as those in Step S105 through Step S108 in FIG. 8 used for explaining the operation of the first embodiment.

Alternatively, the operation in Step S203 may be replaced by operations in Step S2031 through Step 2033 as shown in FIG. 14. Operations in Step S2031 through Step S2033 are the same as those in Step S102 through Step S104, respectively, in FIG. 8 of the first embodiment. The time certification code memory section 106 stores both the server electronic clock 108 and the positioning time information. It should be noted that the smaller the time difference between them, the more improved the power of certification.

The operations of the time certification server 100 and the terminal apparatus 200 according to the second embodiment may thus be described. Here are the effects of the second embodiment.

According to the second embodiment, the positioning time information used at the position of the terminal apparatus and the terminal positioning information obtained by measuring the position thereof may be used to certify the position where the terminal apparatus exists and the time.

According to the second embodiment, the location-dependent information may be used for the terminal positioning information as supplement data to certify time, thereby improving the reliability of the time certification and the terminal positioning information. The location-dependent information may also be used to increase the types of position information, thereby allowing selective use of position information.

According to the second embodiment, when the weather information is image information that includes a large amount of data, data may be compressed by hashing. This makes it possible to minimize the amount of data of the time certification code used to certify time. Since the time certification code is a short reference code, the operation of the terminal apparatus may be simplified. Hashing using the hash function, which is a one-way function, makes it possible to incorporate the terminal information including the terminal identification information and the temporal change information including the weather information in an inseparable manner.

According to the second embodiment, the GPS system may be used to measure the position of the terminal apparatus and acquiring the positioning time information. The time certification server may use the positioning time information outputted by the satellite electronic clock equipped in the GPS satellite and the time outputted by the server electronic clock that is synchronized with the satellite electronic clock. This may improve time accuracy, and as a result, time and a measured position become accurate. Hence, the accuracy of certification may be improved, so that a presentation of an unreliable time with a time lag beyond an acceptable range may be detected, for example.

According to the second embodiment, the time certification method may be implemented as follows. The terminal positioning information that is obtained by measuring the position of the terminal apparatus is included in the terminal information. Then, the time certification server certifies time presented by the terminal apparatus.

According to the second embodiment, the satellite electronic clock equipped in the GPS satellite and the server electronic clock equipped in the time certification server may synchronize with each other. As a result, the time certification server is allowed to calculate a time deference between the time of the positioning time information acquired at a measurement position and the time received from the terminal apparatus. This makes it possible to clarify time to be written in the time certification code to certify the time, and also to keep accurate records.

If there is a big time lag between the time outputted by the satellite electronic clock of the GPS satellite, which is presented by the terminal apparatus, and the time outputted by the time certification server, then it is highly likely that the time and the position presented by the terminal apparatus are fraudulent. In case of a big gap in time or position therebetween, the issue of the time certification code may then be stopped, for example, as a countermeasure.

Embodiment 3

A third embodiment describes a case where the time certification server stores a previously issued time certification code and a newly issued time certification code in correlation with each other. This makes it possible to trace the terminal apparatus that requested the issue of the time certification code retrospectively.

The configuration of a system of the third embodiment is the same as that of the first embodiment (See FIG. 3). The time certification server 100 and the terminal apparatus 200 of the third embodiment are also the same in configuration as those of the first embodiment (See FIG. 4 and FIG. 6).

The receiving section 101 of the time certification server 100 of the third embodiment inputs the terminal information including a previously issued time certification code from the terminal apparatus 200. The second code generating section 104 generates the complete code (an example of the second code) based on the terminal information including the time certification code and the temporal change information including the weather information. The transmitting section 105 transmits the complete code outputted from the second code generating section 104 to the terminal apparatus 200 as a new time certification code.

The time certification code memory section 106 of the time certification server 100 stores the previously issued time certification code and the new time certification code in correlation with each other in a traceable manner. FIG. 15 illustrates this process.

The certification processing section 107, upon receipt of the time certification code from the terminal apparatus 200, retrieves from the time certification code memory section 106 a time certification code that correlates with the time certification code received. The certification processing section 107 then outputs certification information acquired from the time certification code retrieved to the terminal apparatus 200. FIG. 16 illustrates this process. Other elements are the same in function as those of the first embodiment.

Each element of the terminal apparatus 200 is the same in function as that of the first embodiment.

Next, operations of the time certification server 100 and the terminal apparatus 200 of the third embodiment are discussed with reference to the flowchart of FIG. 17.

A time certification method according to the third embodiment may be explained as follows. The terminal apparatus 200 transmits the terminal information including the previously issued time certification code to the time certification server 100. The time certification server 100 receives the terminal information including the previously issued time certification code from the terminal apparatus 200. The time certification server 100 then generates the second code based on the terminal information including the time certification code and the temporal change information. The time certification server 100 then transmits the second code to the terminal apparatus 200 as the new time certification code.

The time certification code memory section 106 of the time certification server 100 stores the previously issued time certification code and the new time certification code in correlation with each other in a traceable manner. The time certification server 100, upon receipt of the time certification code from the terminal apparatus 200, retrieves sequentially from the time certification code memory section 106 a time certification code that correlates with the time certification code received. The time certification server 100 then outputs the certification information acquired from the time certification code retrieved to the terminal apparatus 200.

The operation is now discussed specifically.

The following should be noted: the terminal apparatus 200 holds a previously issued time certification code. The time certification code issue requesting section 201 of the terminal apparatus 200 transmits the issue request for the time certification code and the terminal information including the issued time certification code to the time certification server 100 (Step S300). The terminal information obviously includes the terminal identification information (terminal ID) and time, which will not be mentioned every time.

The receiving section 101 of the time certification server 100 receives the terminal information including the issued time certification code (Step S301). The receiving section 101 then generates the complete code (an example of the second code) based on the terminal information including the time certification code and the temporal change information including the weather information (Step S302). The transmitting section 105 of the time certification server 100 then transmits the complete code to the terminal apparatus 200 as the new time certification code (Step S303). Then, the time certification code memory section 106 of the time certification server 100 stores the time certification code in correlation with time generated by the server electronic clock 108 of the time certification server 100 (Step S304).

The terminal apparatus 200 receives the new time certification code and the time (Step S305). The stamping section 202 then stamps the time certification code and the time on a product or the like (Step S306).

Alternatively, the operation in Step S302 may be replaced by operations in Step S3021 through Step S3023 as shown in FIG. 18. The operations in Step S3021 through Step S3023 are equivalent to those in Step S102 through Step S104, respectively, shown in FIG. 8 discussed in the first embodiment.

The terminal apparatus 200 of a consumer who purchased a product transmits a time certification code stamped on the product to the time certification server 100. In response, the terminal apparatus 200 receives time based on the time certification code from the time certification sever 100. This operation for checking the authenticity of the time stamped is discussed next with reference to the flowchart of FIG. 19.

The time verification section 204 of the terminal apparatus 200 receives an input of the time certification code stamped on the product from the consumer (Step S400). The time verification section 204 then transmits the time certification code to the time certification server 100 over the communication network 300 (Step S401).

The certification processing section 107 of the time certification server 100 receives the time certification code (Step S402). The certification processing section 107 then searches the time certification code memory section 106 using the time certification code received, and retrieves corresponding time and a corresponding terminal ID. The certification processing section 107 also retrieves sequentially time certification codes that correlate with the time certification code (Step S403). The certification processing section 107 then generates certification information corresponding to each time certification code based on retrieved time and a retrieved terminal ID that correlate with each time certification code. The certification processing section 107 then transmits the certification information to the terminal apparatus 200 (Step S404).

The time verification section 204 of the terminal apparatus 200 receives the certification information (Step S405). The time verification section 204 then makes access to each terminal apparatus by using the terminal identification information (terminal ID) included in the respective pieces of the certification information. The time verification section 204 then traces the record of the route of the time certification codes. The time verification section 204 may otherwise make access to each terminal apparatus and give an instruction (Step S406).

The operations of the time certification server 100 and the terminal apparatus 200 according to the third embodiment may thus be described. Here are the effects of the third embodiment.

According to the third embodiment, the terminal apparatus may use the new time certification code including the previously issued time certification code. This makes it possible to trace the terminal apparatus to which the time certification code was issued in the past. The history may thus be identified.

According to the third embodiment, terminals that the time certification code routed through may be traced by using the time certification code alone. It is also possible to certify which terminal the time certification code routed through by a single process.

According to the third embodiment, with an IC tag or the like whose limitation on length of a code that can be stored therein is moderate, the reading of a single time certification code allows all the information that relates to previously issued time certification codes included to be obtained. This may contribute to highly efficient calculation and data acquisition as well as effective use of past information. This may also make routing information more accurate.

According to the third embodiment, if the time certification codes are issued continuously, then the time certification server is allowed to detect some trouble that occurred in a previous step and a problem regarding traceability that should occur. Then, at that stage, the time certification server may notify the next step of the potential problem.

Embodiment 4

A fourth embodiment describes a case of adding to the time certification code information indicating that the contents of the terminal information transmitted by the terminal apparatus meets a condition if it meets the condition.

The configuration of a system of the fourth embodiment is the same as that of the first embodiment (See FIG. 3).

FIG. 20 is a diagram illustrating a functional configuration of a time certification server 100 according to the fourth embodiment.

The time certification server 100 modifies that of the first embodiment by adding a condition checking section 110 and a special code instruction section 111. The condition checking section 110 detects whether or not information acquired from the terminal information meets a predetermined condition. When the condition checking section 110 detects that the information acquired from the terminal information meets the predetermined condition, the special code instruction section 111 instructs the second code generating section 104 to add a special code indicating that the terminal information meets the predetermined condition.

The time certification server 100 further includes an inhibiting section 112. When the condition checking section 110 detects that the information acquired from the terminal information meets the predetermined condition, the inhibiting section 112 inhibits the second code generating section 104 from generating the second code.

The condition checking section 110 detects whether or not the terminal identification information (terminal ID), user identification information, contract identification information, time and the like included in the terminal information received from the terminal apparatus 200 meet the predetermined condition.

The special code instruction section 111 receives a signal indicating that the information acquired from the terminal information meets the predetermined condition from the condition checking section 110. The special code instruction section 111 then instructs the second code generating section 104 to add the special code to the second code if the time certification code needs to include the result.

The inhibiting section 112 receives from the condition checking section 110 the signal indicating that the information acquired from the terminal information meets the predetermined condition. The inhibiting section 112 then instructs the second code generating section 104 about inhibition of the second code generation when the time certification code should not be generated.

The terminal apparatus 200 is the same in configuration as that of the first embodiment.

Next, operations of the time certification server 100 and the terminal apparatus 200 according to the fourth embodiment are discussed with reference to the flowchart of FIG. 21.

Basically, the operations are the same as those discussed with reference to FIG. 13 in the second embodiment. After Step S202, the operation proceeds as follows.

The receiving section 101 transmits to the condition checking section 110 the terminal information received (Step S2021). The condition checking section 110 judges whether or not at least one of the terminal positioning information, positioning time information, location-dependent information (temperature, air pressure, humidity, base station ID, etc.) included in the terminal information meets a preset condition (Step S2022). As a result of the judgement, if a match is made with a condition to add the special code to the reference code (an example of the second code), then the special code instruction section 111 instructs the second code generating section 104 to include the special code in the second code. If a match is made with a condition to inhibit the generation of the second code ("Yes" in Step S2022) as a result of the judgement, then the inhibiting section 112 inhibits the second code generating section 104 from generating the second code (Step S2023). The operation then proceeds to Step S203. As a result of the judgement in Step S2022, if no match is made, then the operation proceeds to Step S203 without the process of Step S2023.

According to the fourth embodiment, if the content of the terminal information does not agree with any conditions, then information indicating the disagreement may be included in the time certification code generated by the time certification server. Besides, the issue of the time certification code may be inhibited, so that the problem is prevented from spreading.

If a possible threat of disease infection of livestock is detected, for example, the following measures may be taken to inhibit edible meat produced from the livestock from being distributed. Information on this event may be written in the terminal information at any step in the process of distribution. The condition checking section 110, when detecting the information, may inhibit the issue of the time certification code, so that meat distribution is inhibited. Alternatively, this event may be written in the time certification code, so that the information is accompanied with the livestock meat through the rest of the distribution process.

The time certification code may be issued as information indicating the state of preservation of food. For example, when the temperature of the storage of food is over 40 degrees Centigrade, the time certification code may indicate the danger of eating the food. When the temperature is 20 degrees Centigrade or below, the time certification code may indicate the safety of eating the food. As another example, the time certification code may distinguish between domestic and overseas food. Color coding may otherwise be applicable.

According to the fourth embodiment, if a preset condition is provided for the terminal apparatus, such a mechanism may be implemented that the time certification server receives the condition and issues a special time certification code corresponding to the condition.

In the event that the position of a terminal apparatus moves due to theft, for example, it is possible to detect the movement of the terminal apparatus and record in the time certification code the inhibition of future issue of the time certification code or the movement of the terminal apparatus.

Embodiment 5

A fifth embodiment describes a selective use of appropriate weather information from among a plurality of pieces of weather information for time certification.

FIG. 22 is a diagram illustrating the configuration of a system that implements time certification according to the fifth embodiment. The configuration of the system of the fifth embodiment is different from that of the first embodiment in that two or more weather satellites 410 and two or more weather information centers 400 exist therein. The time certification server 100 and the terminal apparatus 200 are the same in configuration as those of the first embodiment. FIG. 22 shows a single weather information center 400, more than one of which may also be used.

The temporal change information input section 102 of the time certification server 100 is connectable to two or more weather information centers 400 (an example of a source device) that provide weather information (an example of the temporal change information). The temporal change information input section 102 selects one of the weather information centers 400 according to time, thereby inputting the weather information.

The temporal change information input section 102 of the time certification server 100 may otherwise select one of the weather information centers 400 at random, thereby inputting the weather information. The temporal change information input section 102 may otherwise select a weather information center 400 based on a predetermined algorithm. The temporal change information input section 102 may otherwise select a weather information center 400 with a drastic change in the weather.

According to the fifth embodiment, the time certification server 100, when issuing the time certification code, selects an appropriate one of the weather information centers 400 (e.g., the weather information centers in Japan, USA, Europe, etc.). The time certification server 100 is provided with weather information from the appropriate weather information center to generate the time certification code by executing the has process discussed in the first embodiment.

Specific operations of the time certification server 100 and the terminal apparatus 200 are the same as those shown in FIG. 8 and FIG. 9 discussed in the first embodiment.

According to the fifth embodiment, the selective use of weather information from among the plurality of pieces of weather information may improve the reliability of operation of the system. More frequent reception of weather information, which provides dense weather information, may also improve time certification accuracy and time certification performance

Figure 1:
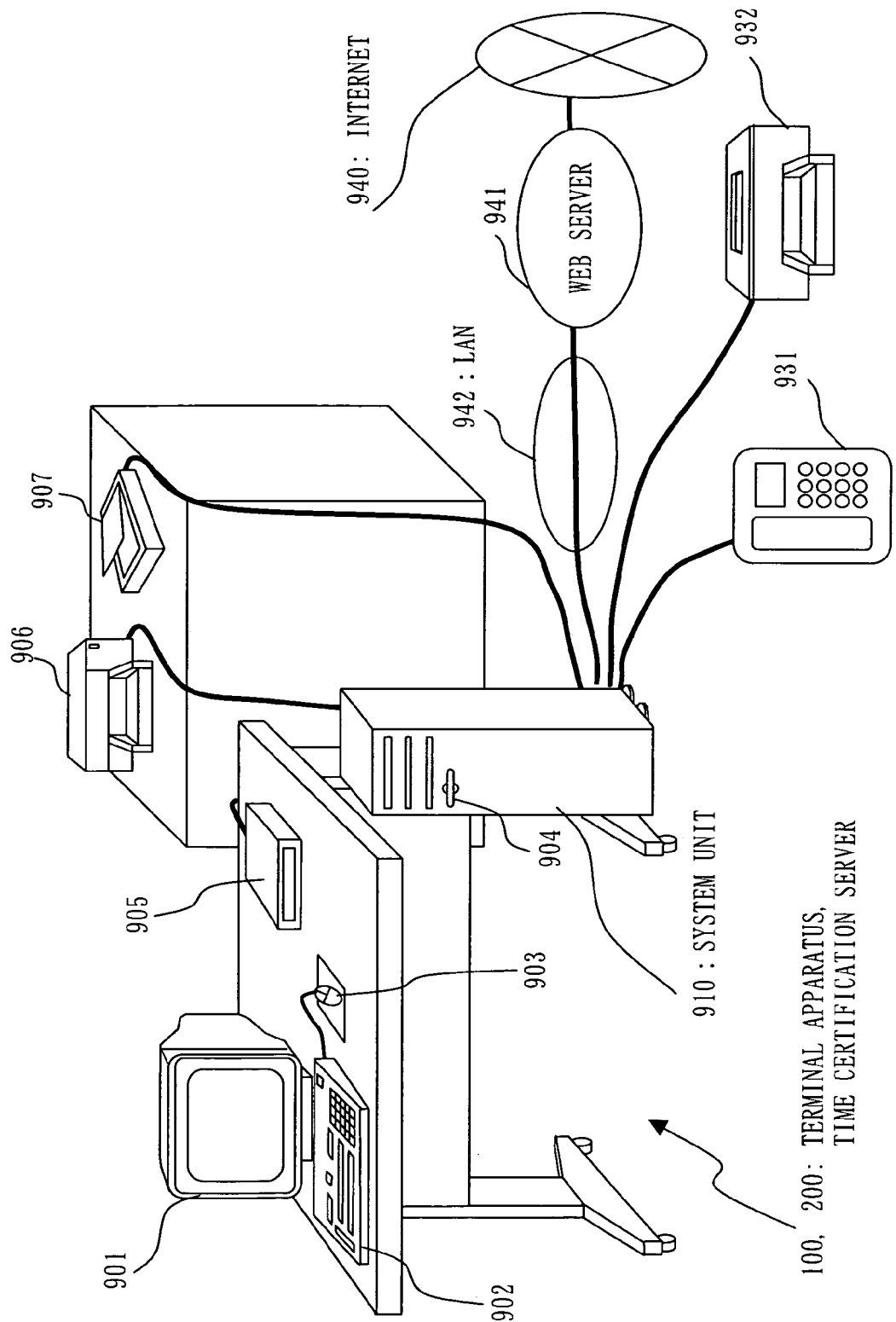
[FIG. 1] It is a diagram illustrating an external view of a terminal apparatus and a time certification server according to a first embodiment.
Figure 2:
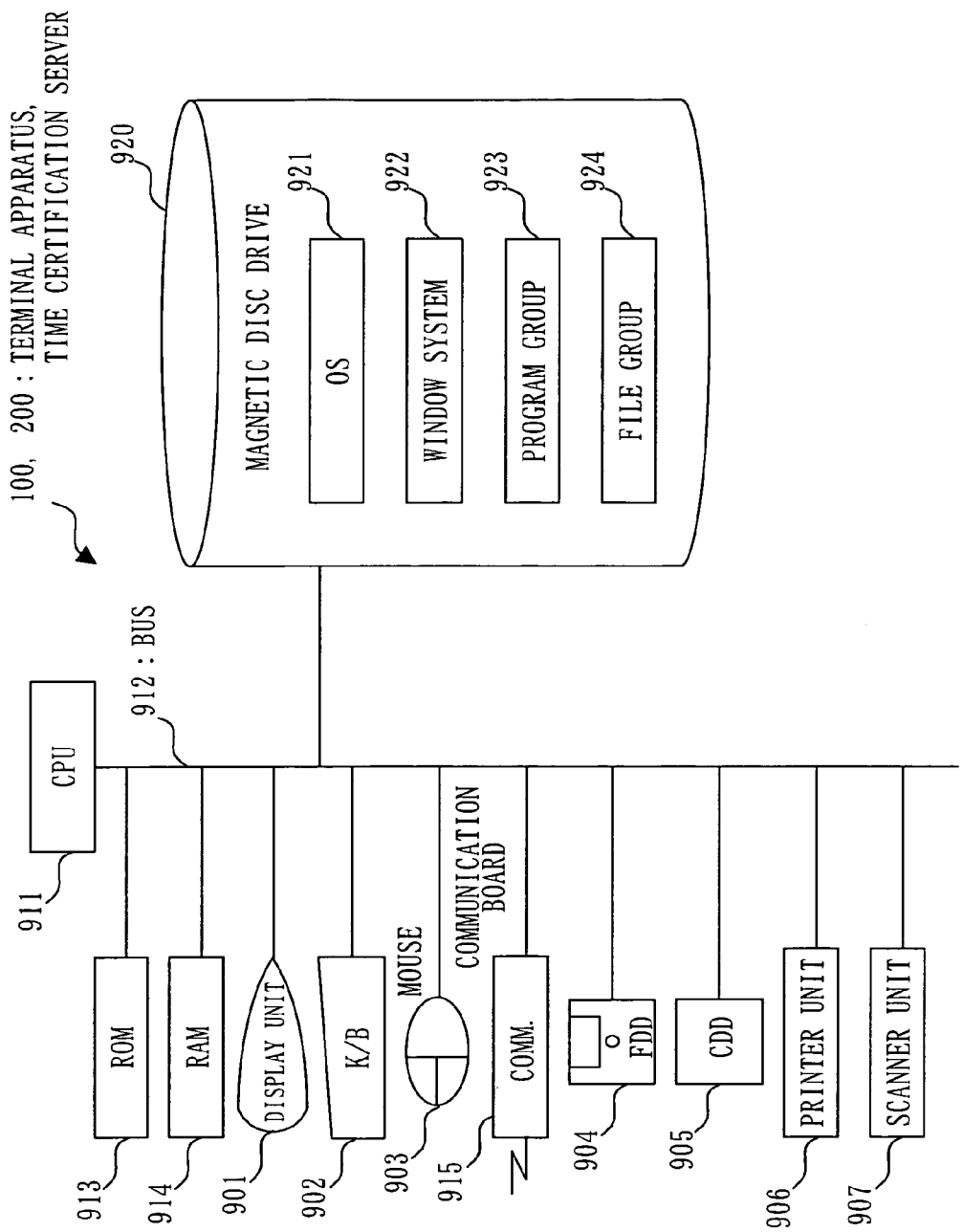
[FIG. 2] It is a diagram illustrating a hardware configuration of the terminal apparatus and the time certification server of the first embodiment when implemented by computer.
Figure 3:
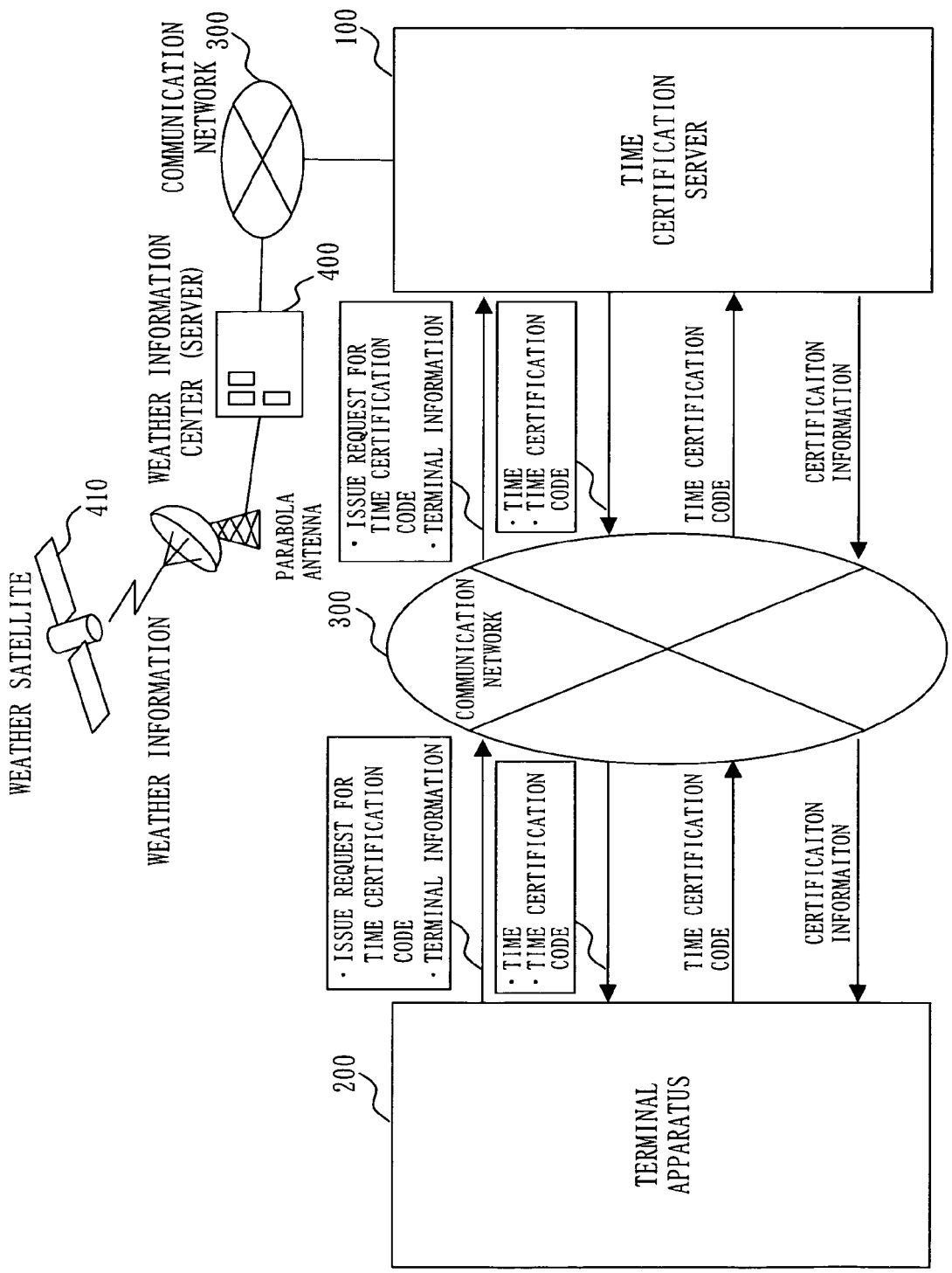
[FIG. 3] It is a diagram illustrating the configuration of a system that carries out time certification according to the first embodiment.
Figure 4:
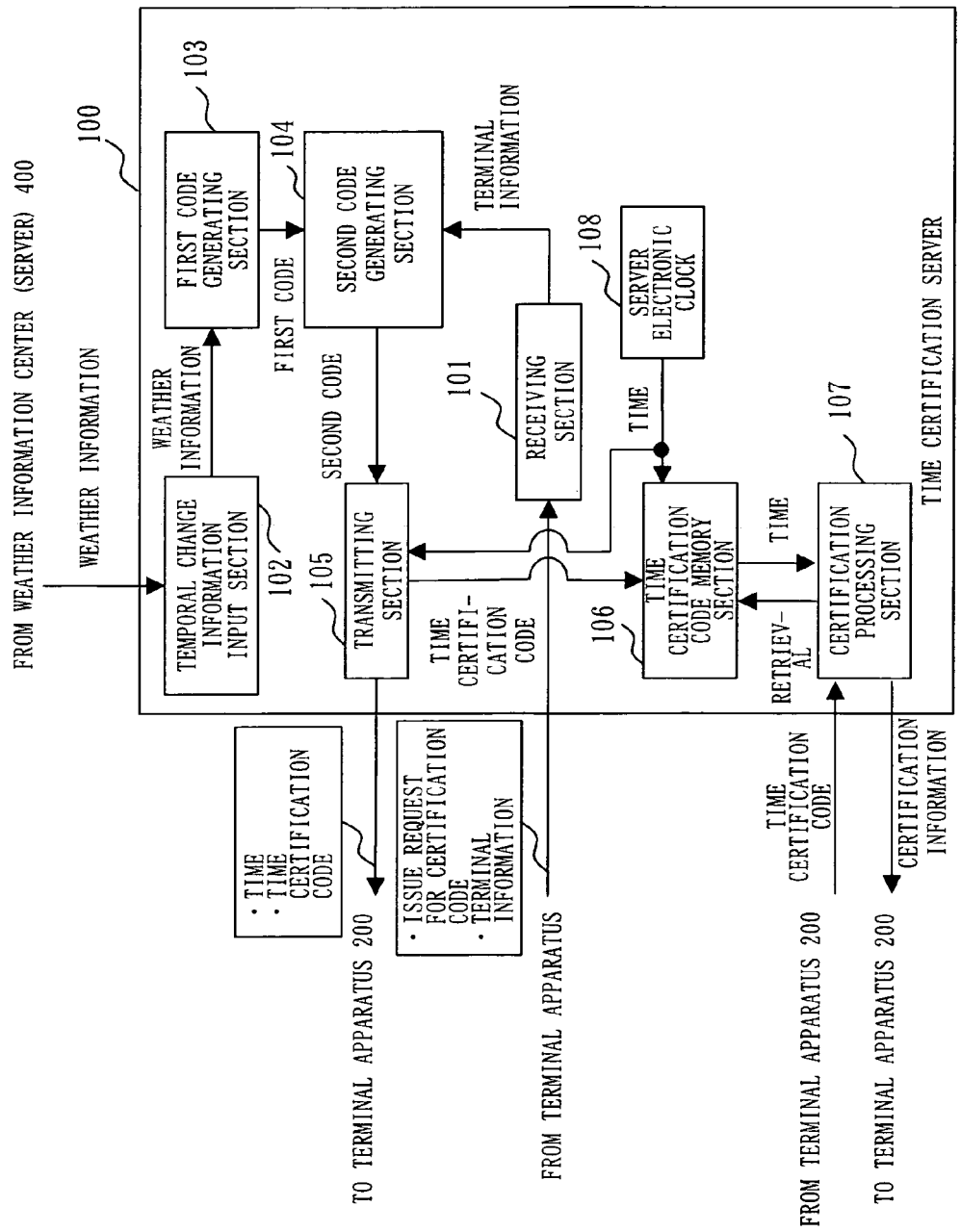
[FIG. 4] It is a diagram illustrating a functional configuration of the time certification server according to the first embodiment.
Figure 5:
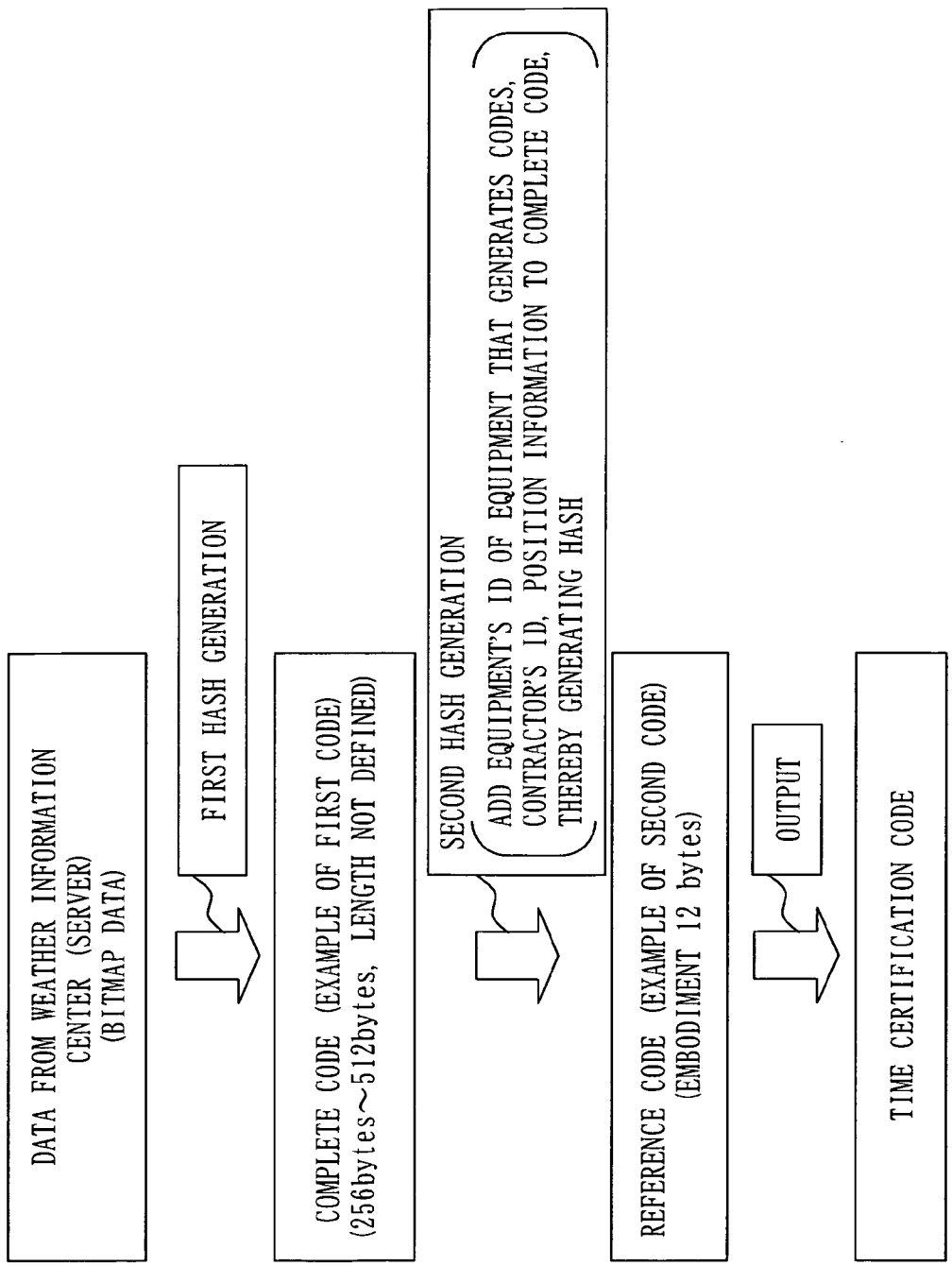
[FIG. 5] It is a diagram illustrating a method of generating a complete code (a first code) and a reference code (a second code) according to the first embodiment.
Figure 6:
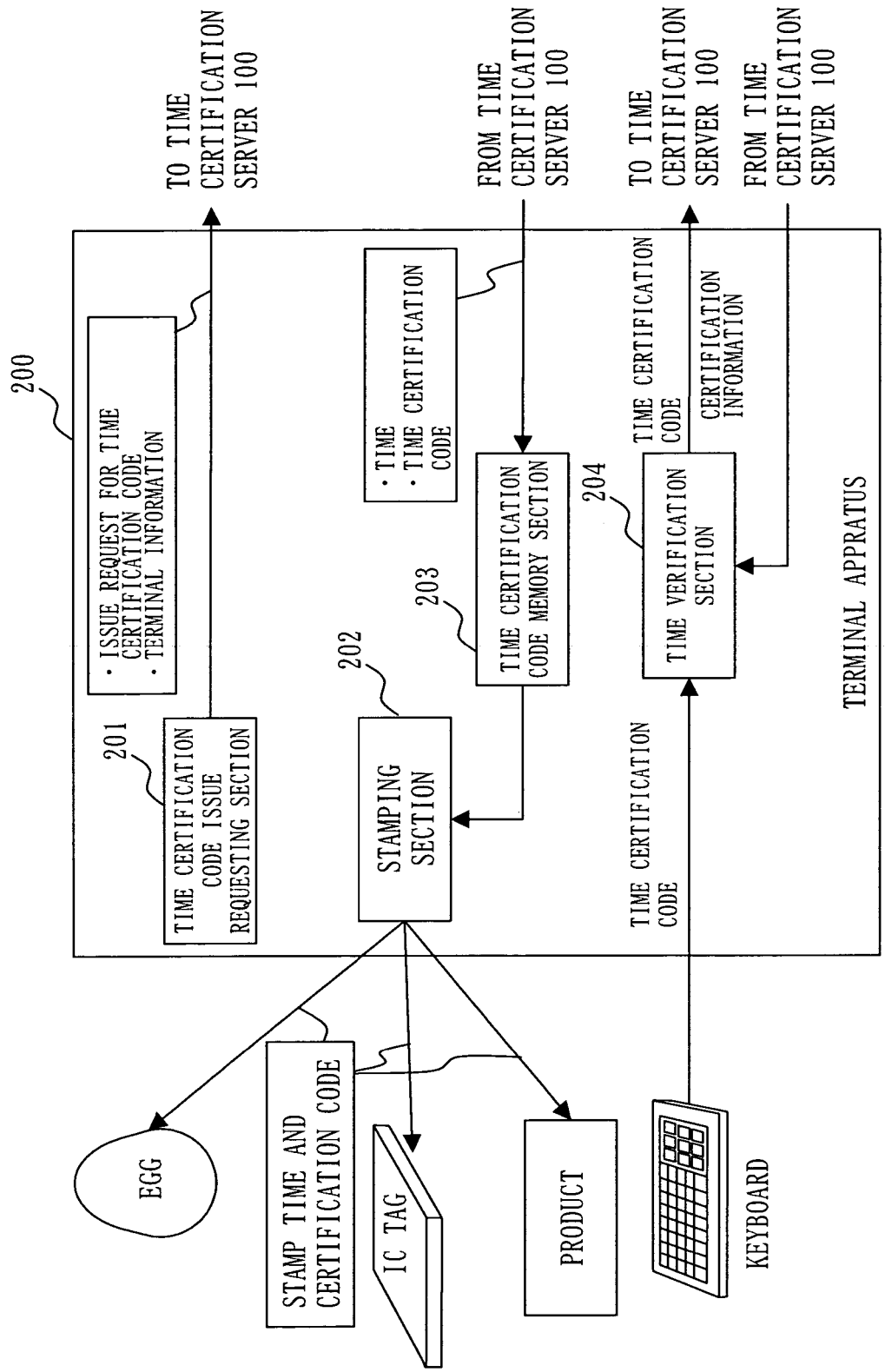
[FIG. 6] It is a diagram illustrating a functional configuration of the terminal apparatus according to the first embodiment.
Figure 7:
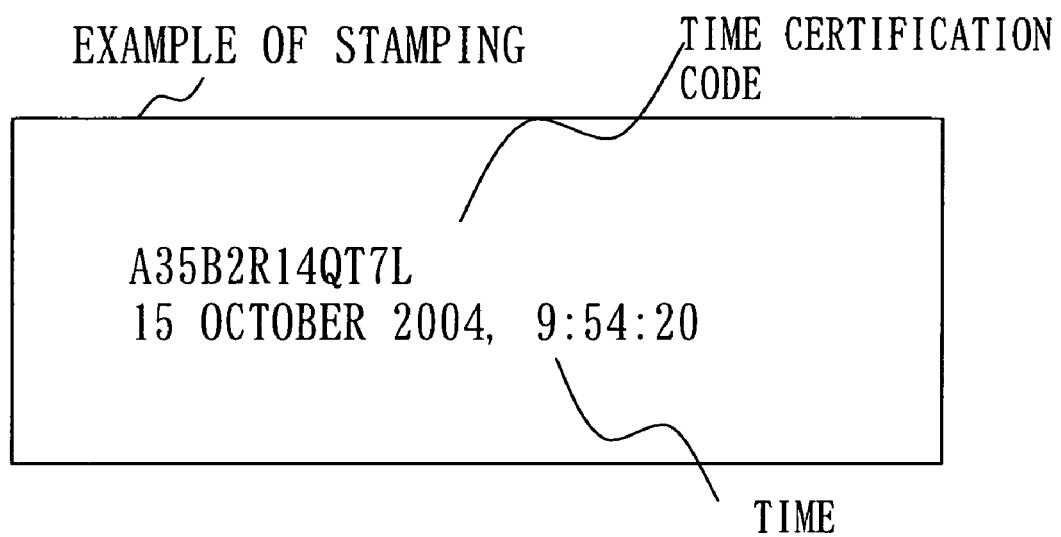
[FIG. 7] It is a diagram illustrating an example of a stamp on a product according to the first embodiment.
Figure 8:
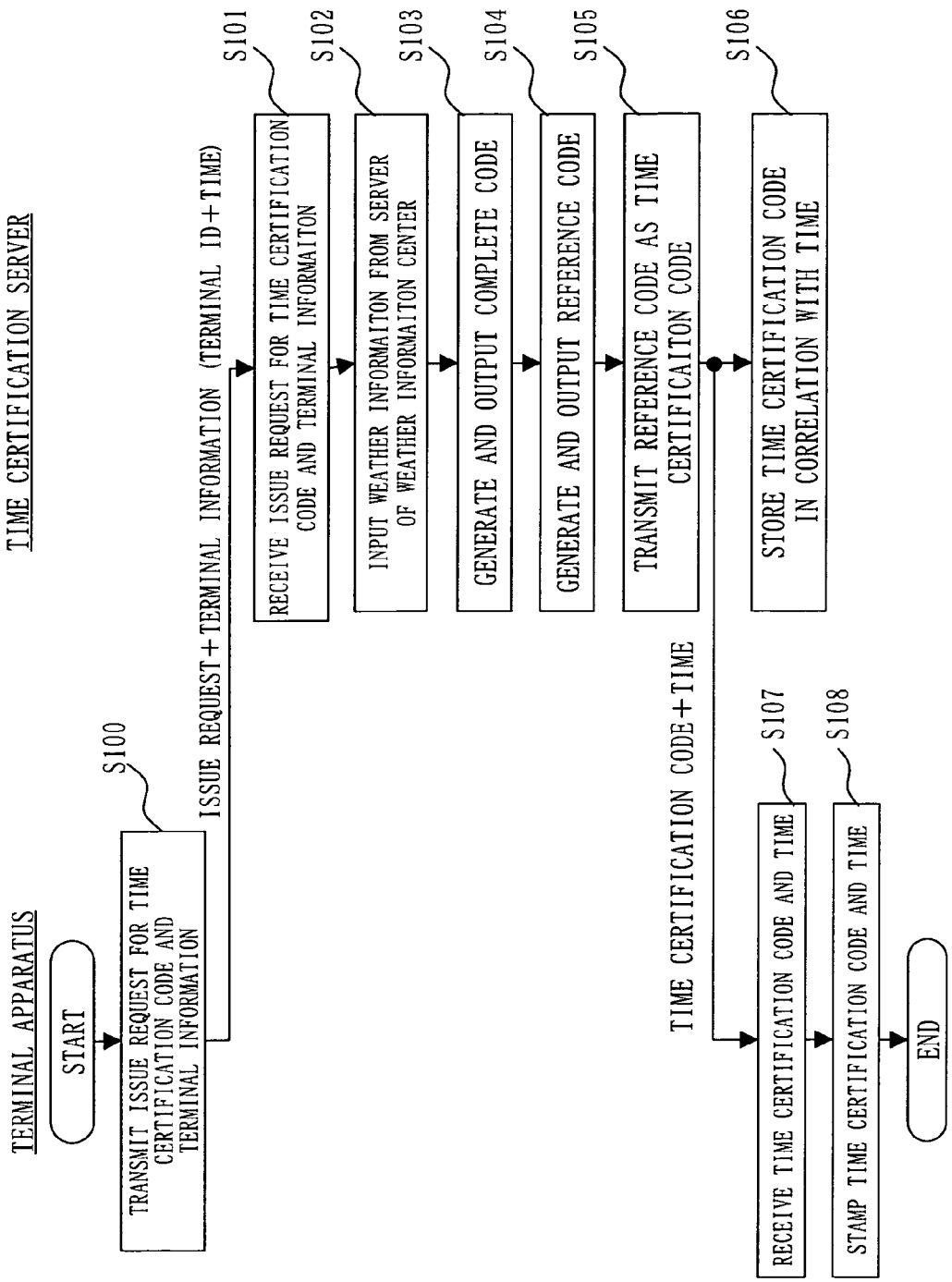
[FIG. 8] It is a flowchart illustrating an operation of a time certification method performed by the time certification server and the terminal apparatus according to the first embodiment.
Figure 9:
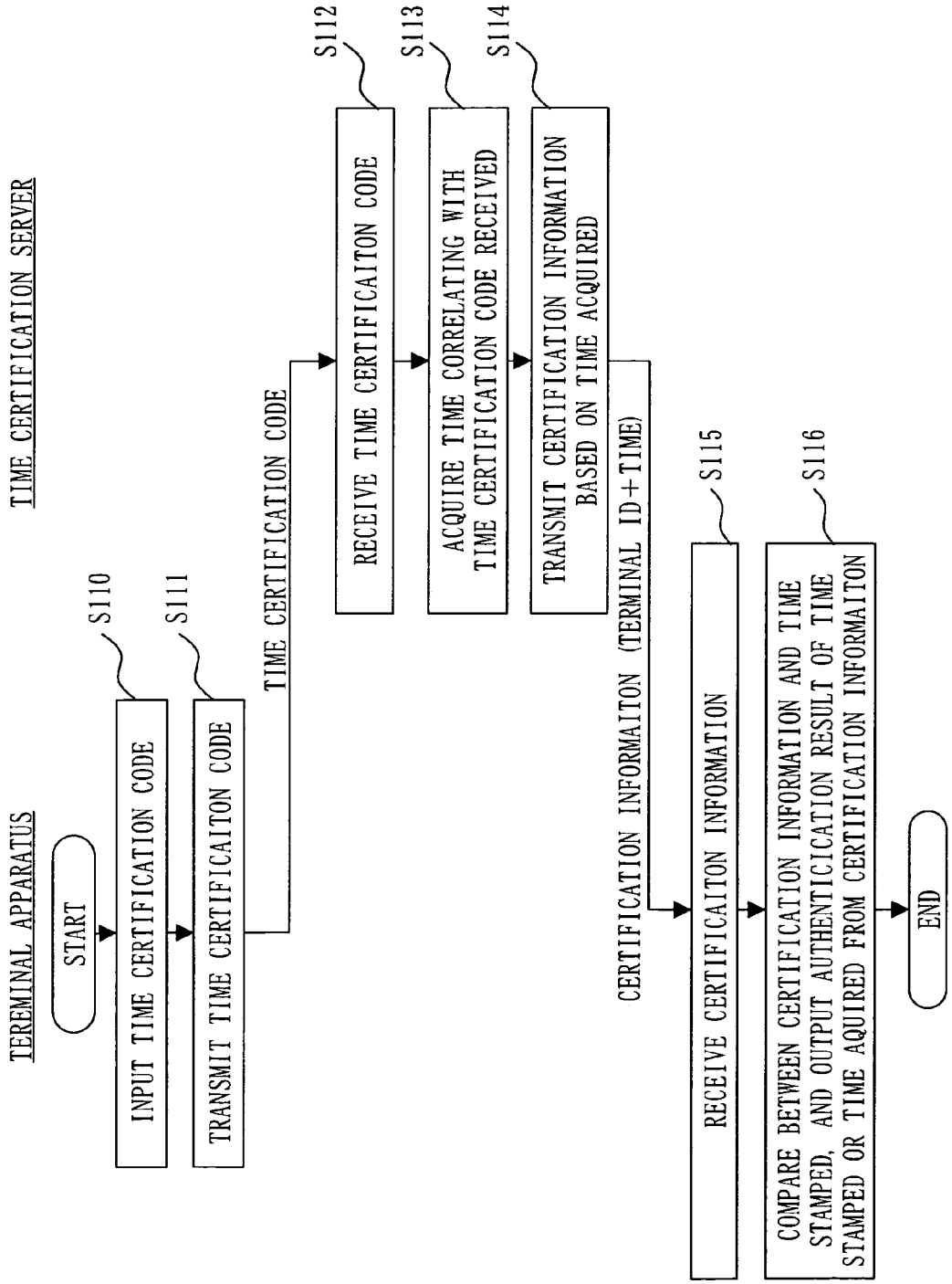
[FIG. 9] It is a diagram illustrating an operation of the terminal apparatus that verifies the authenticity of stamped time according to the first embodiment.
Figure 10:
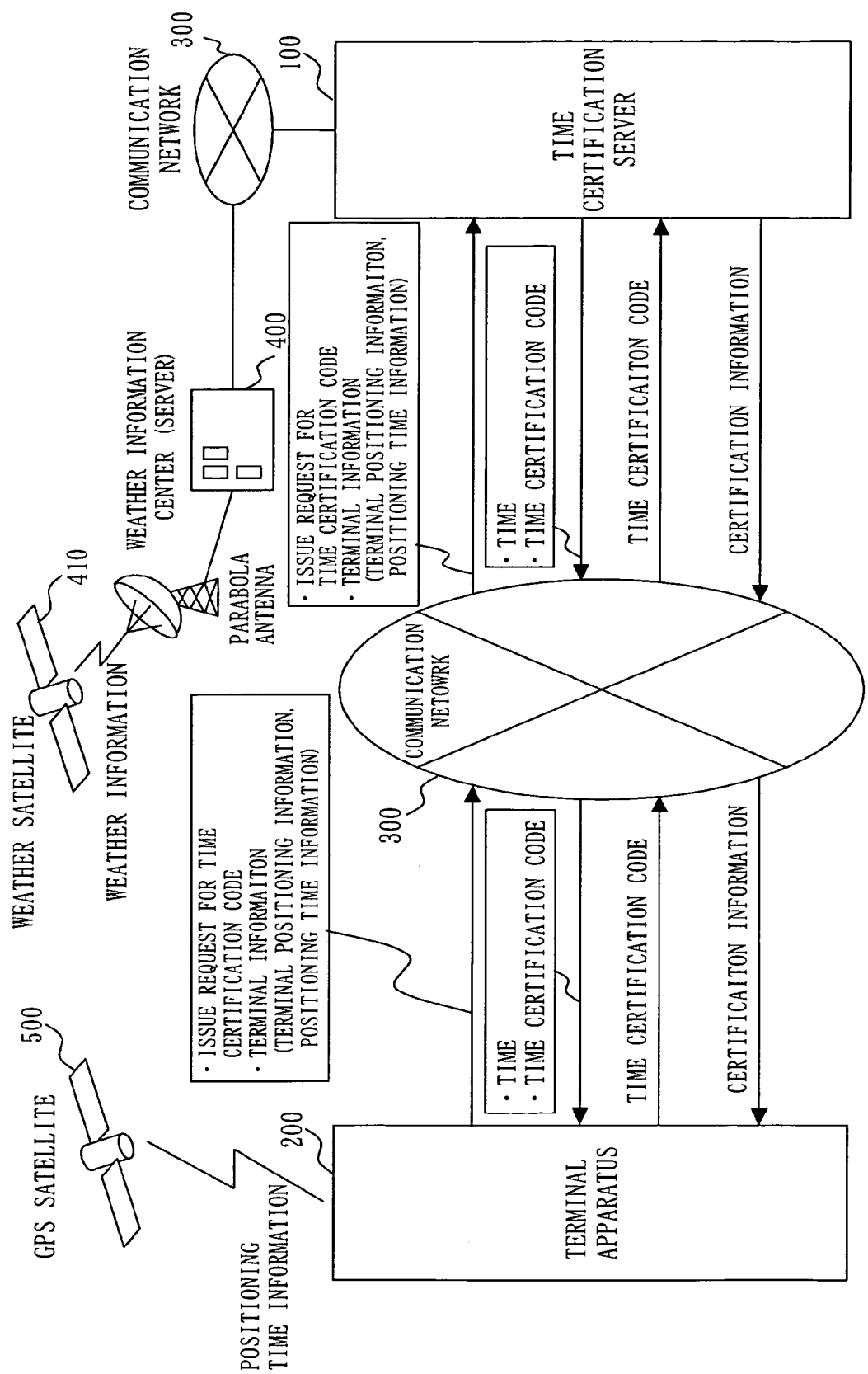
[FIG. 10] It is a diagram illustrating the configuration of a system that carries out time certification according to a second embodiment.
Figure 11:
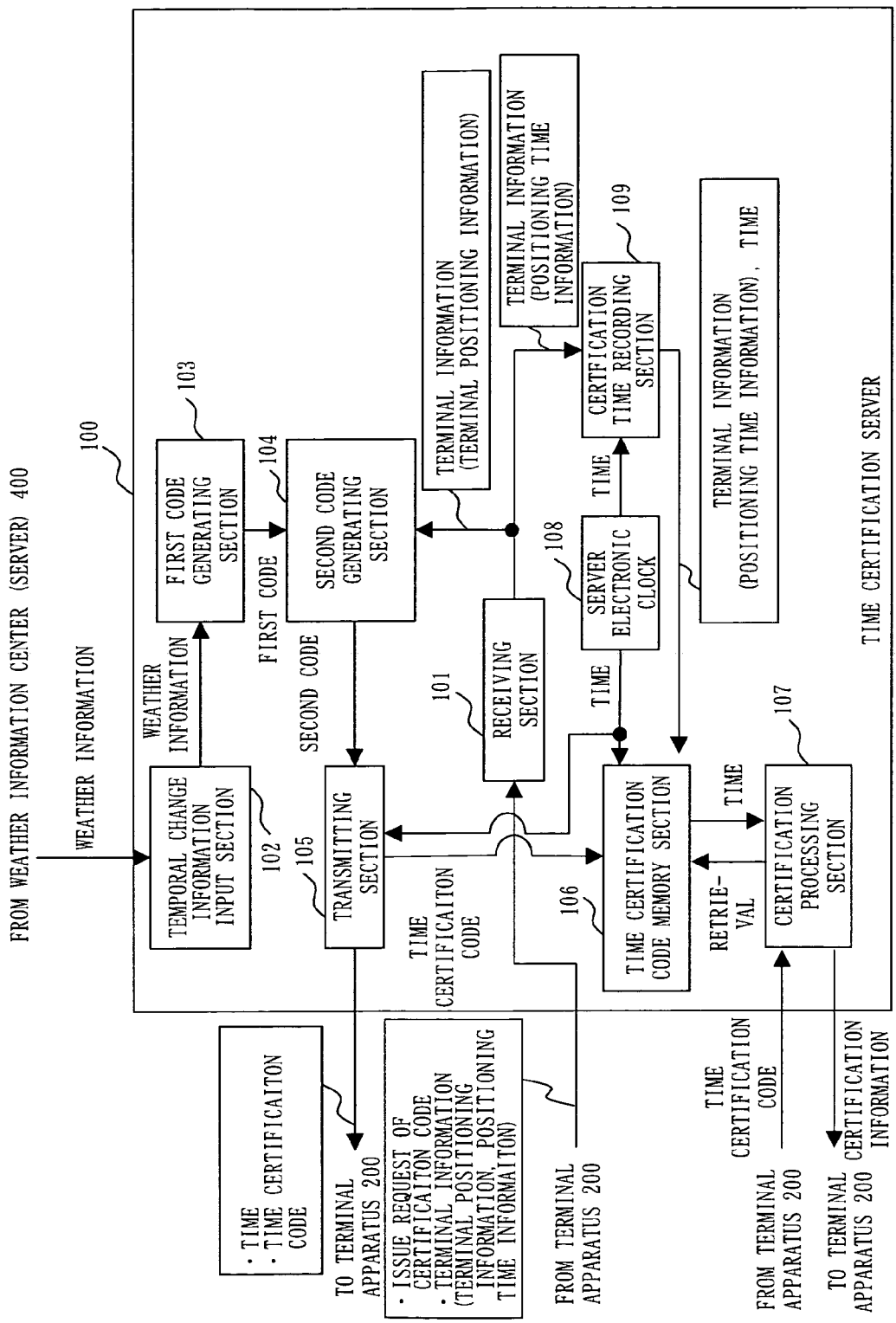
[FIG. 11] It is a diagram illustrating the configuration of a time certification server according to the second embodiment.
Figure 12:
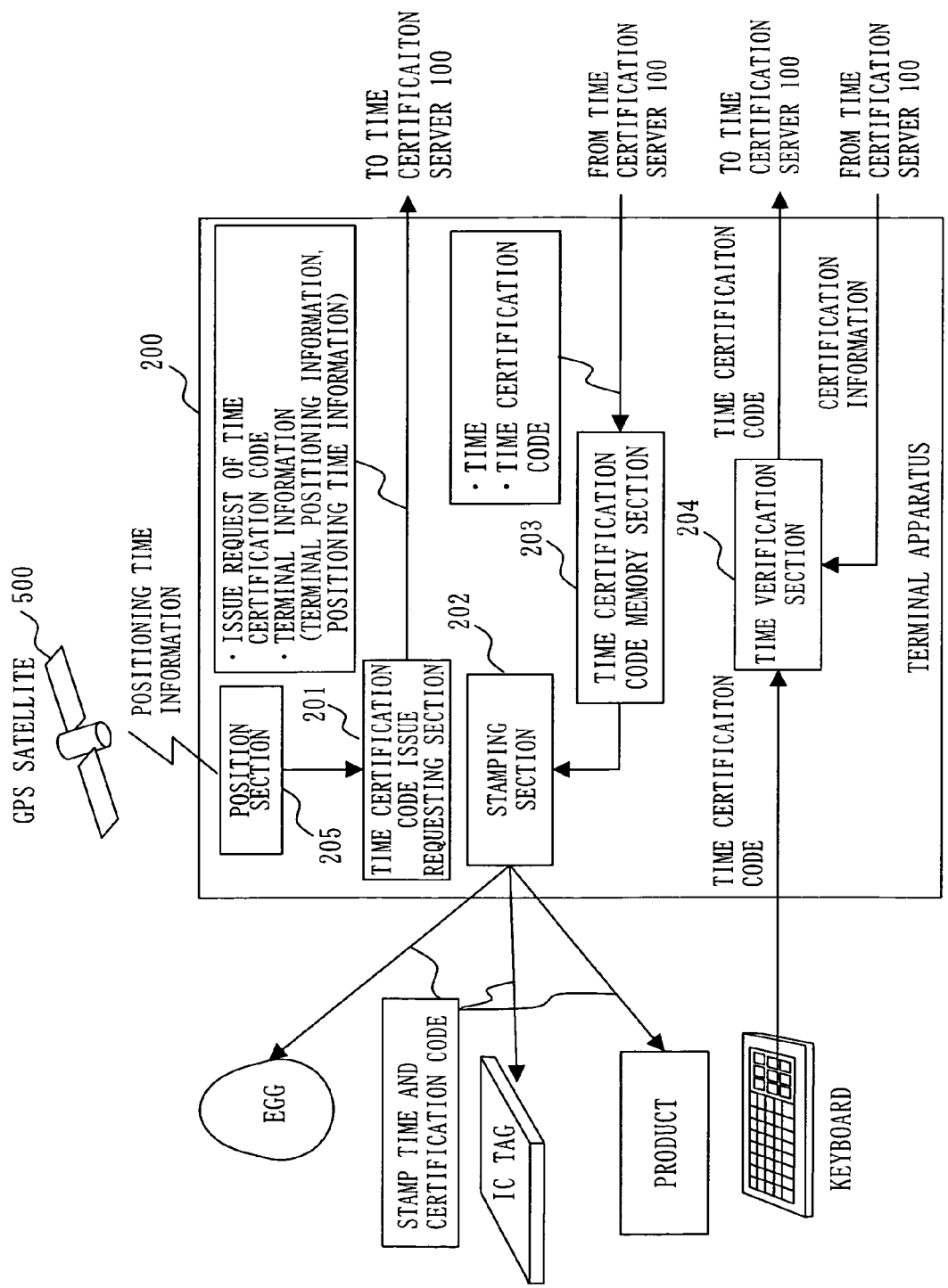
[FIG. 12] It is a diagram illustrating the configuration of a terminal apparatus according to the second embodiment.
Figure 13:
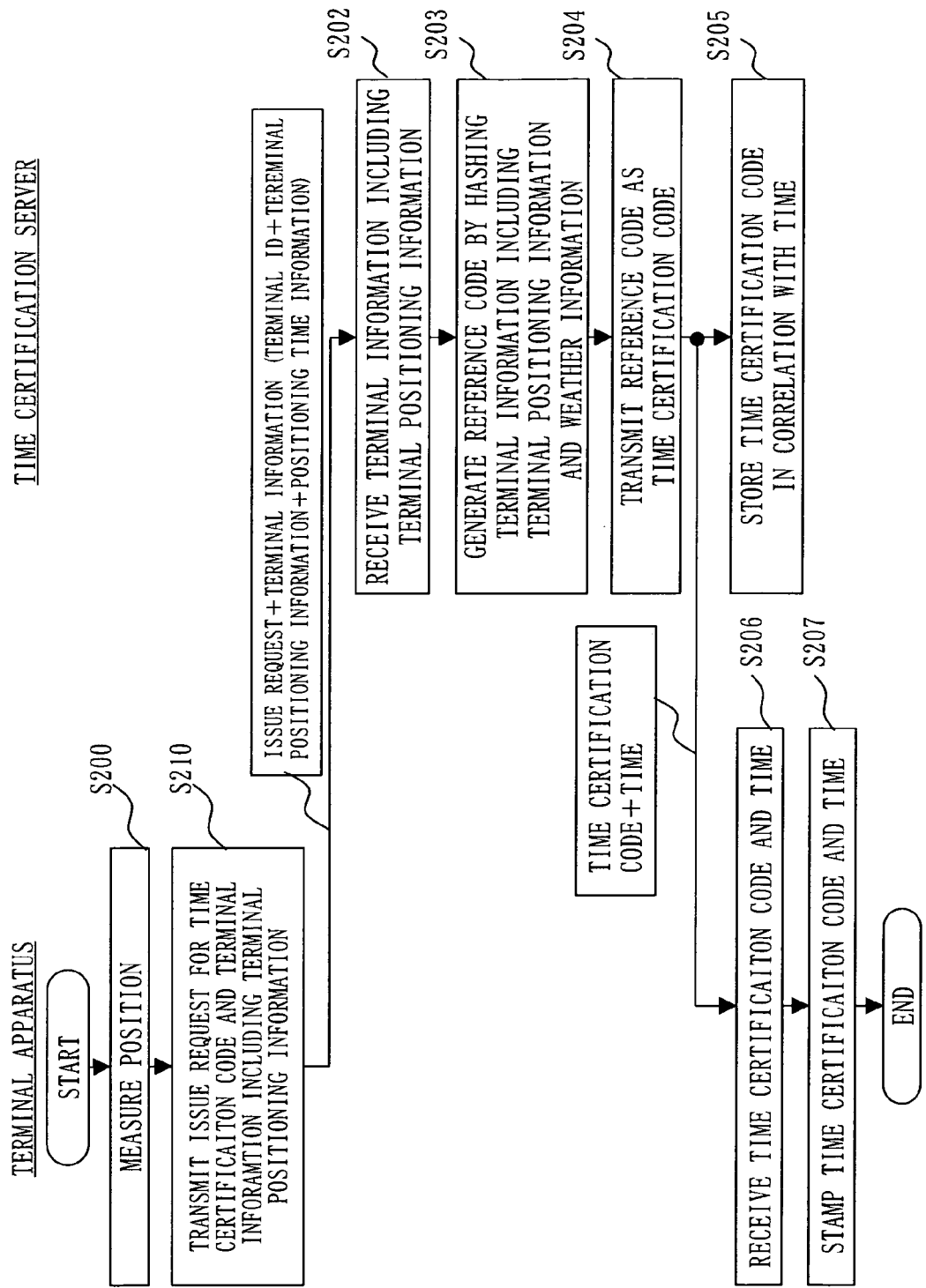
[FIG. 13] It is a flowchart illustrating operations of the time certification server and the terminal apparatus according to the second embodiment.
Figure 14:
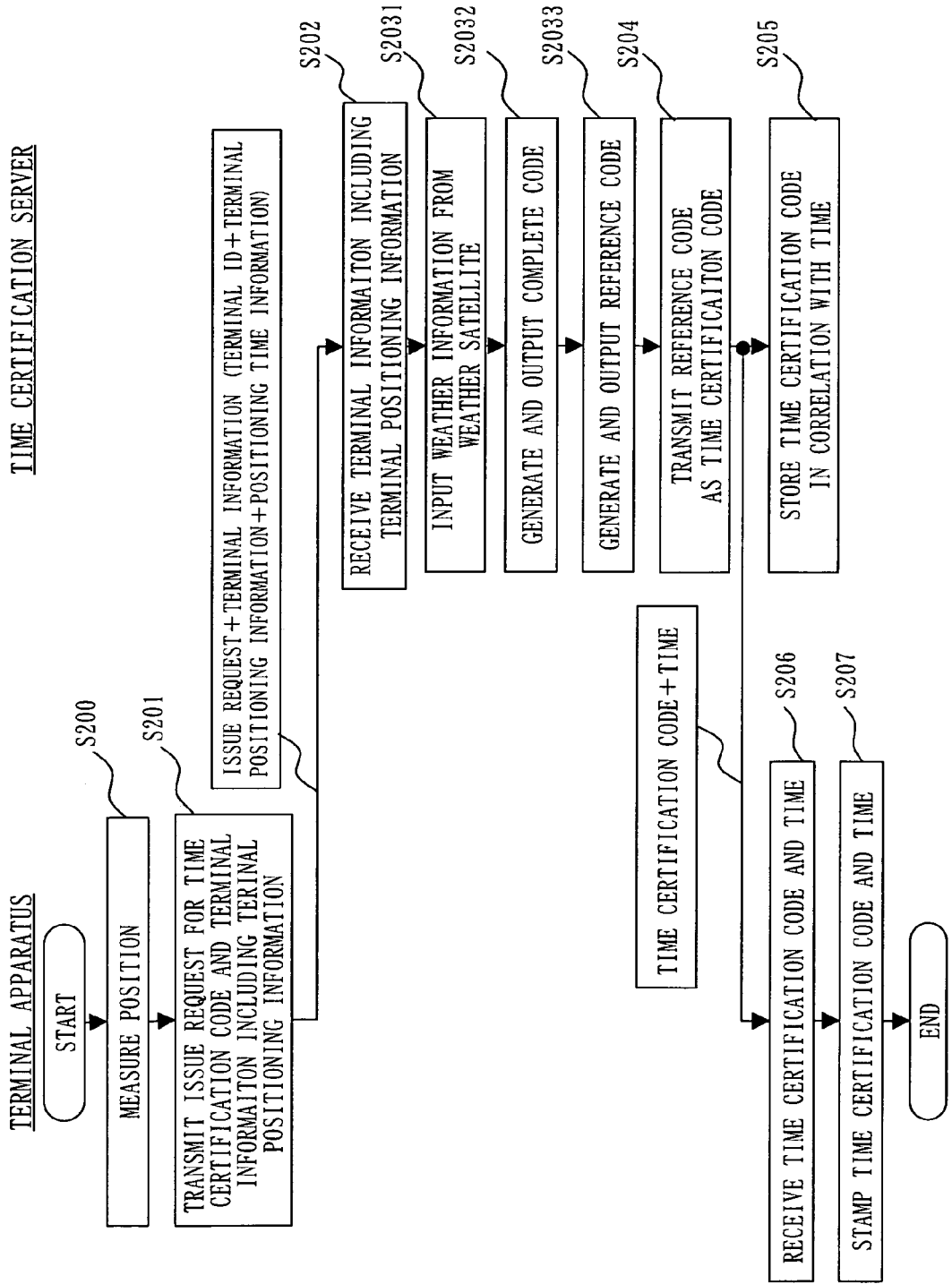
[FIG. 14] It is a flowchart illustrating operations of the time certification server and the terminal apparatus according to the second embodiment in detail.
Figure 15:
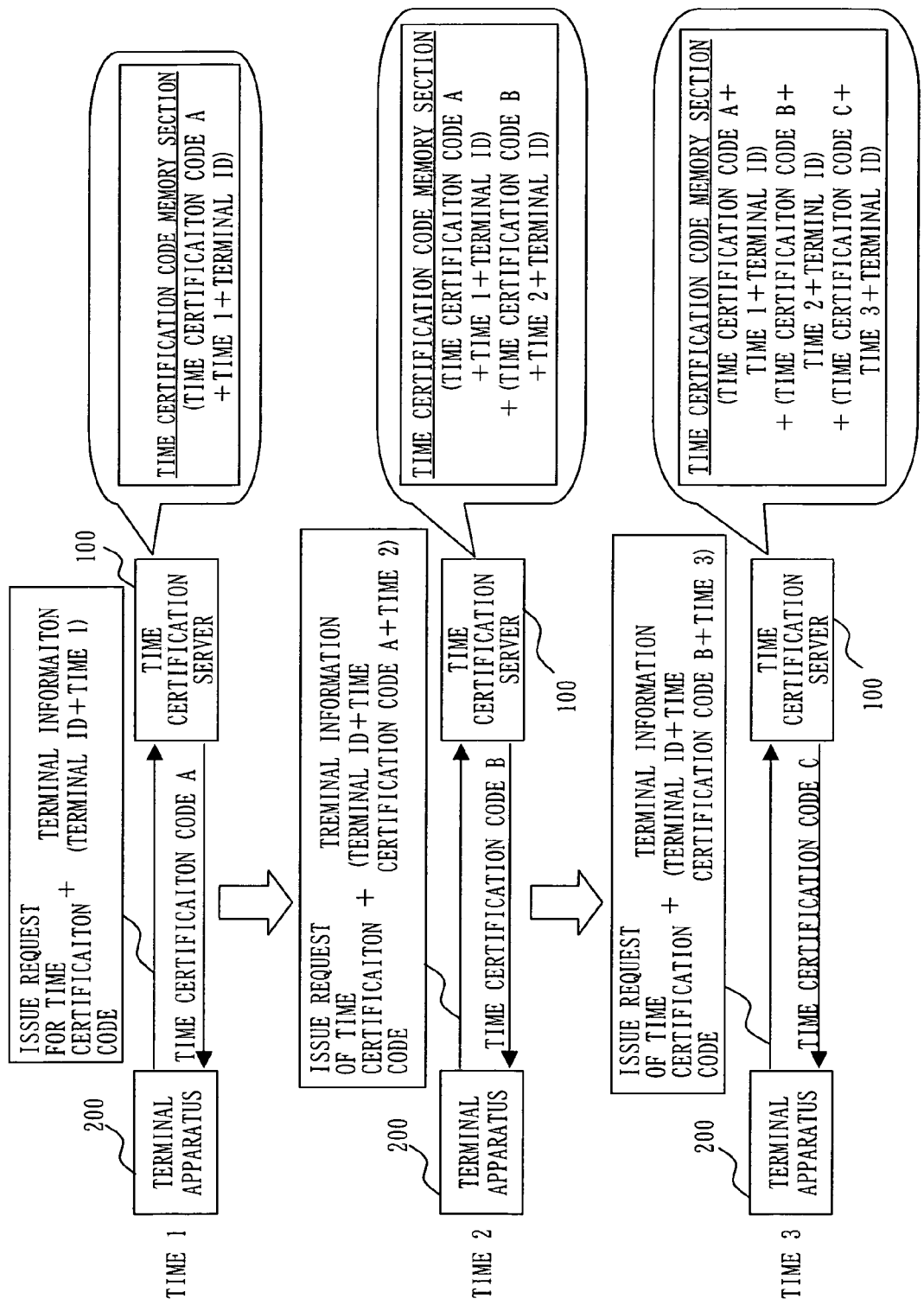
[FIG. 15] It is a diagram illustrating a process performed by a time certification code memory section of a time certification server according to a third embodiment in which a previously issued time certification code and a new time certification code are stored in correlation with each other in a traceable manner.
Figure 16:
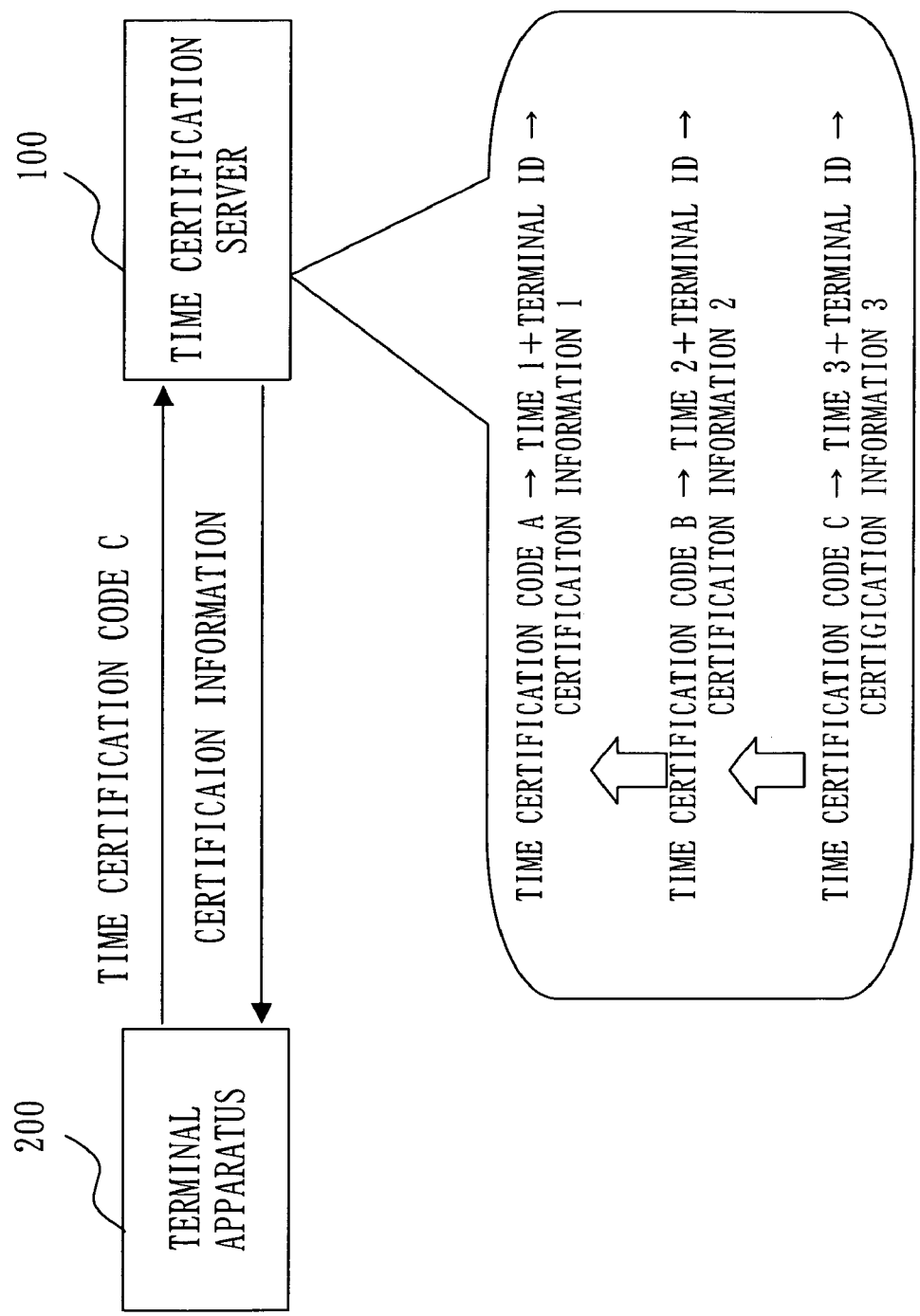
[FIG. 16] It is a diagram illustrating a process performed by a certification processing section of the time certification server according to the third embodiment in which a time certification code that correlates with a time certification code received from a terminal apparatus is retrieved from a time certification code memory section, and acquired certification information is outputted to the terminal apparatus.
Figure 17:
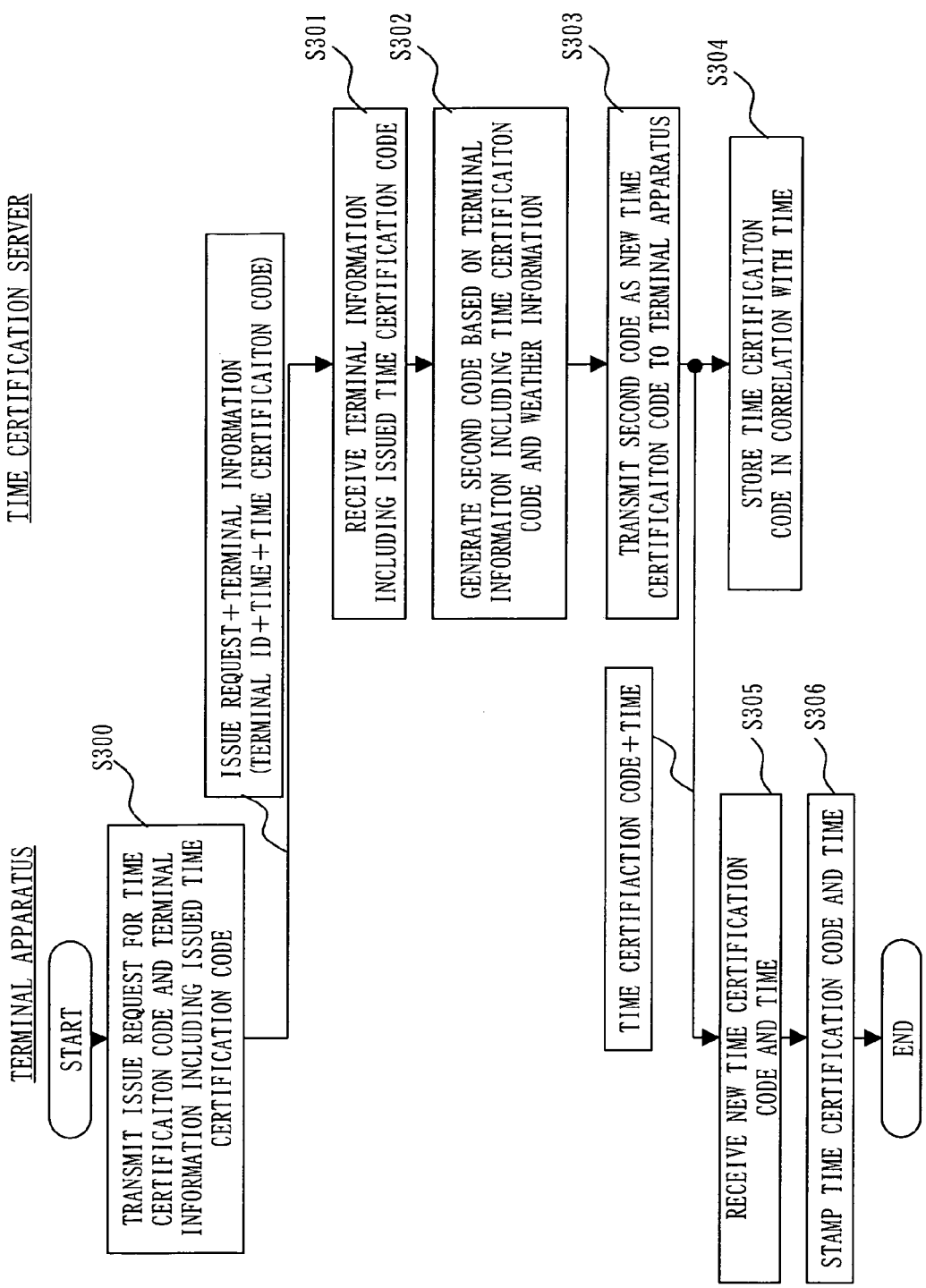
[FIG. 17] It is a flowchart illustrating operations of the time certification server and the terminal apparatus according to the third embodiment.
Figure 18:
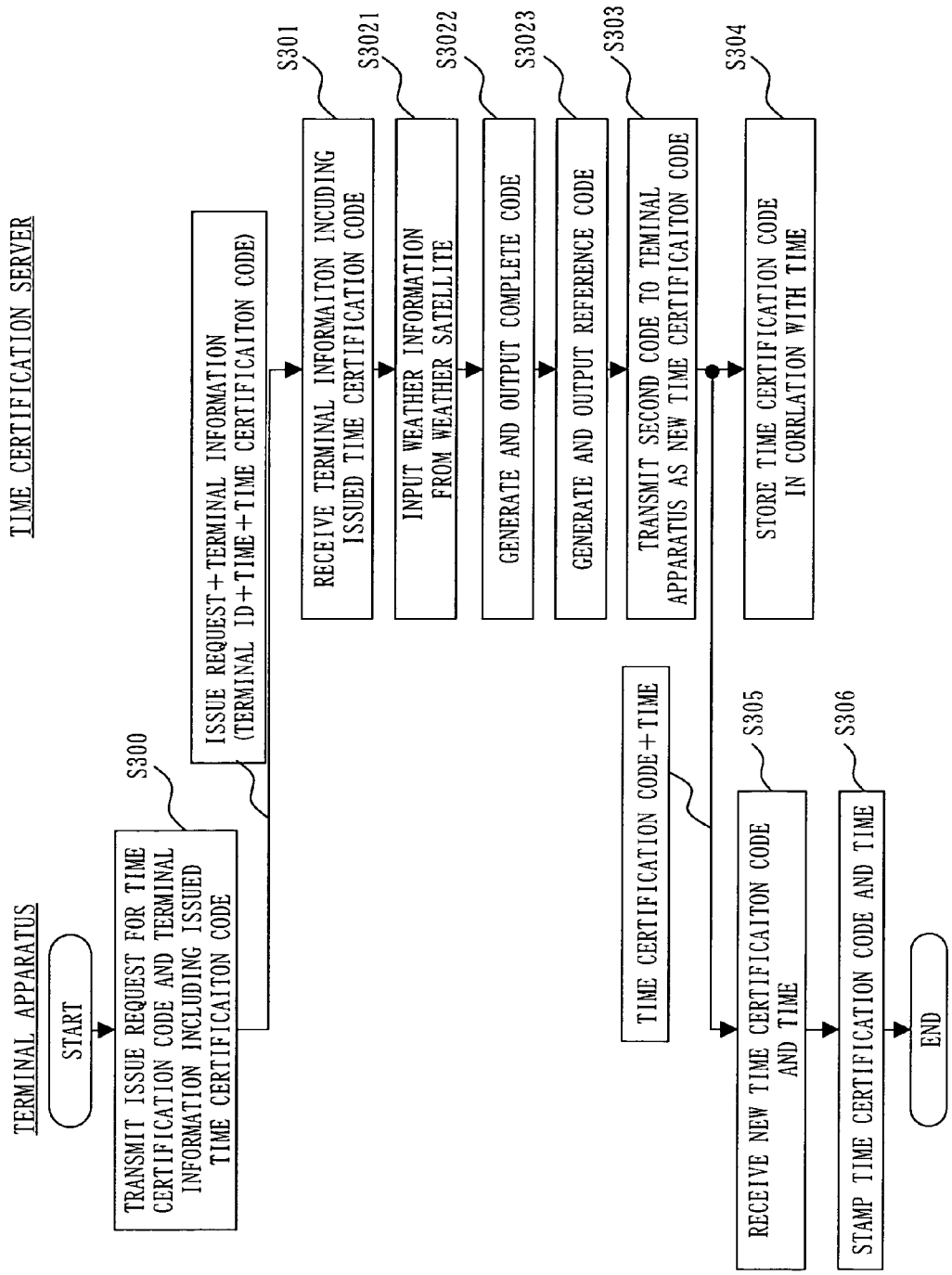
[FIG. 18] It is a flowchart illustrating the operations of the time certification server and the terminal apparatus according to the third embodiment in detail.
Figure 19:
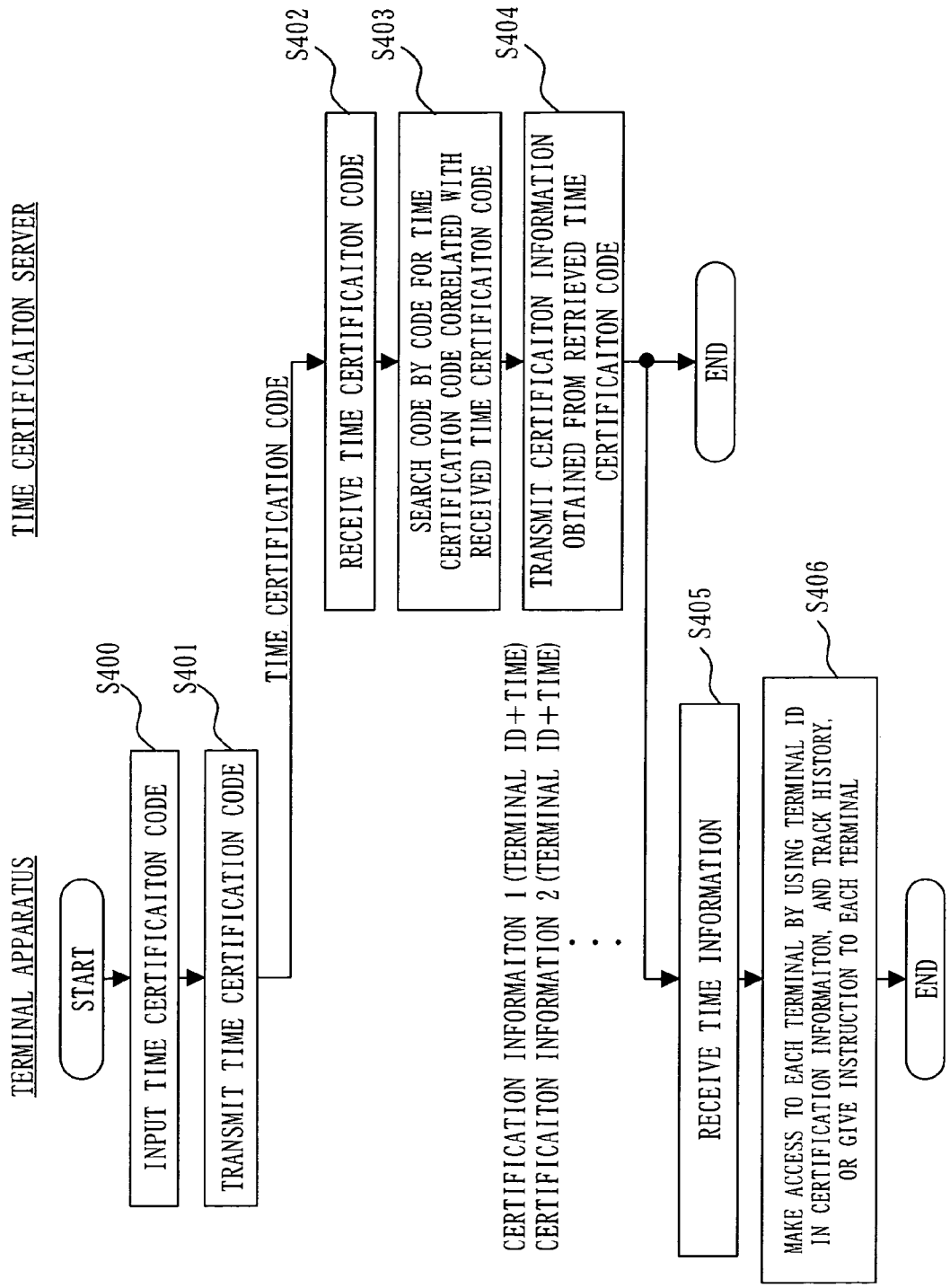
[FIG. 19] It is a flowchart illustrating an operation of the terminal apparatus that transmits a time certification code to the time certification server, and receives time based on the time certification code from the time certification server, which allows the authenticity of stamped time to be verified, according to the third embodiment.
Figure 20:
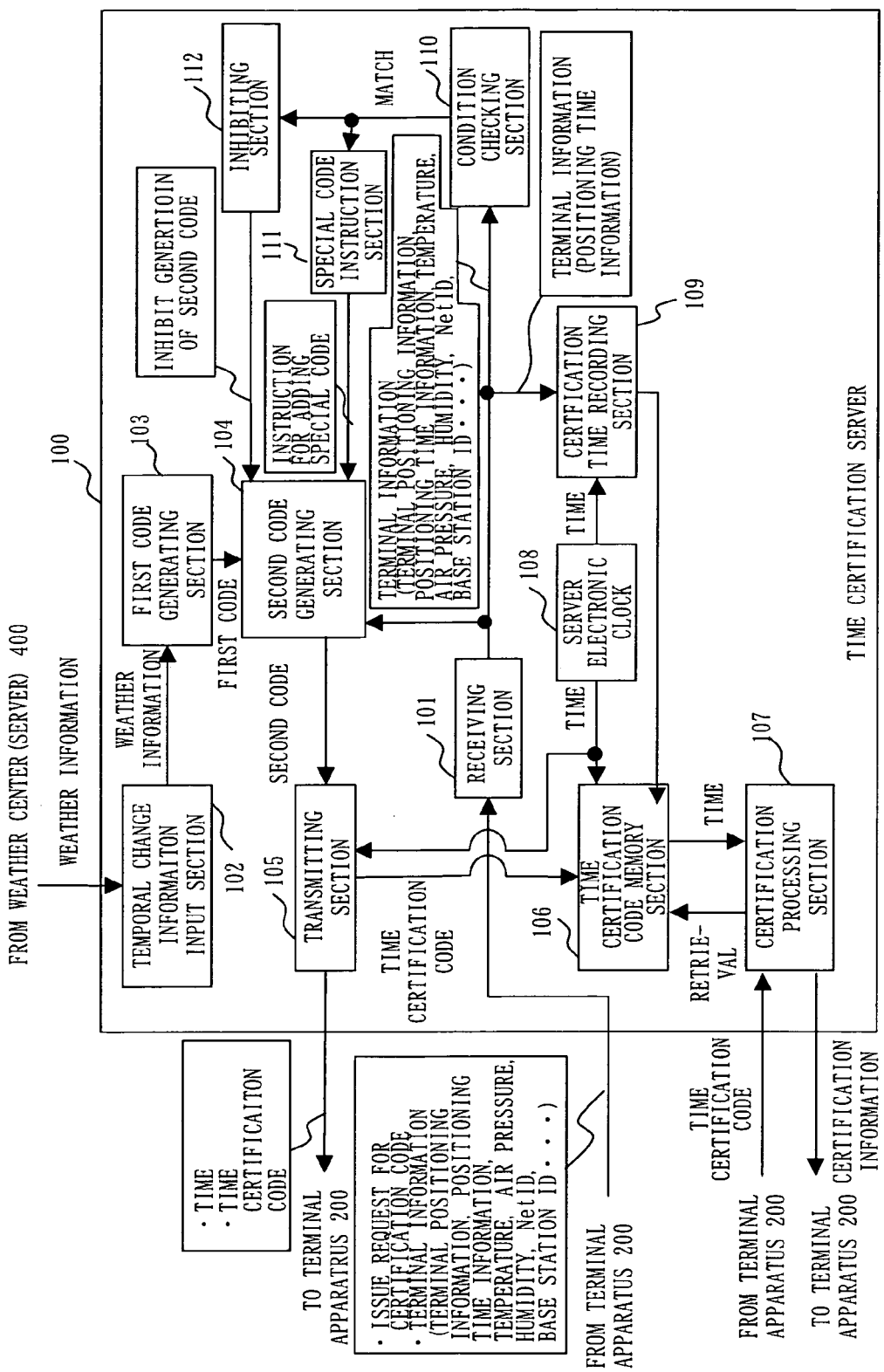
[FIG. 20] It is a diagram illustrating the configuration of a time certification server according to a fourth embodiment.
Figure 21:
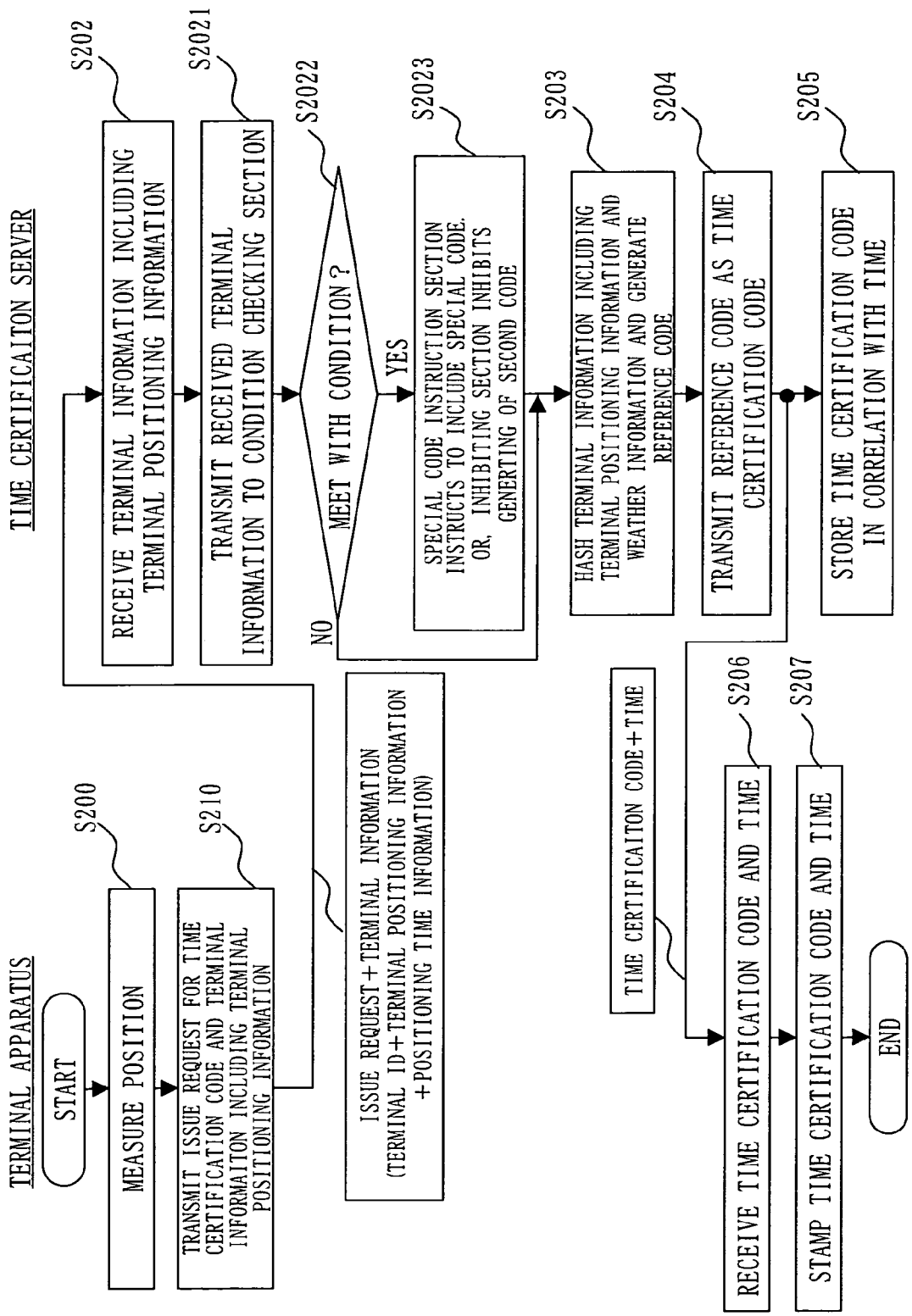
[FIG. 21] It is a flowchart illustrating operations of the time certification server and a terminal apparatus according to the fourth embodiment.
Figure 22:
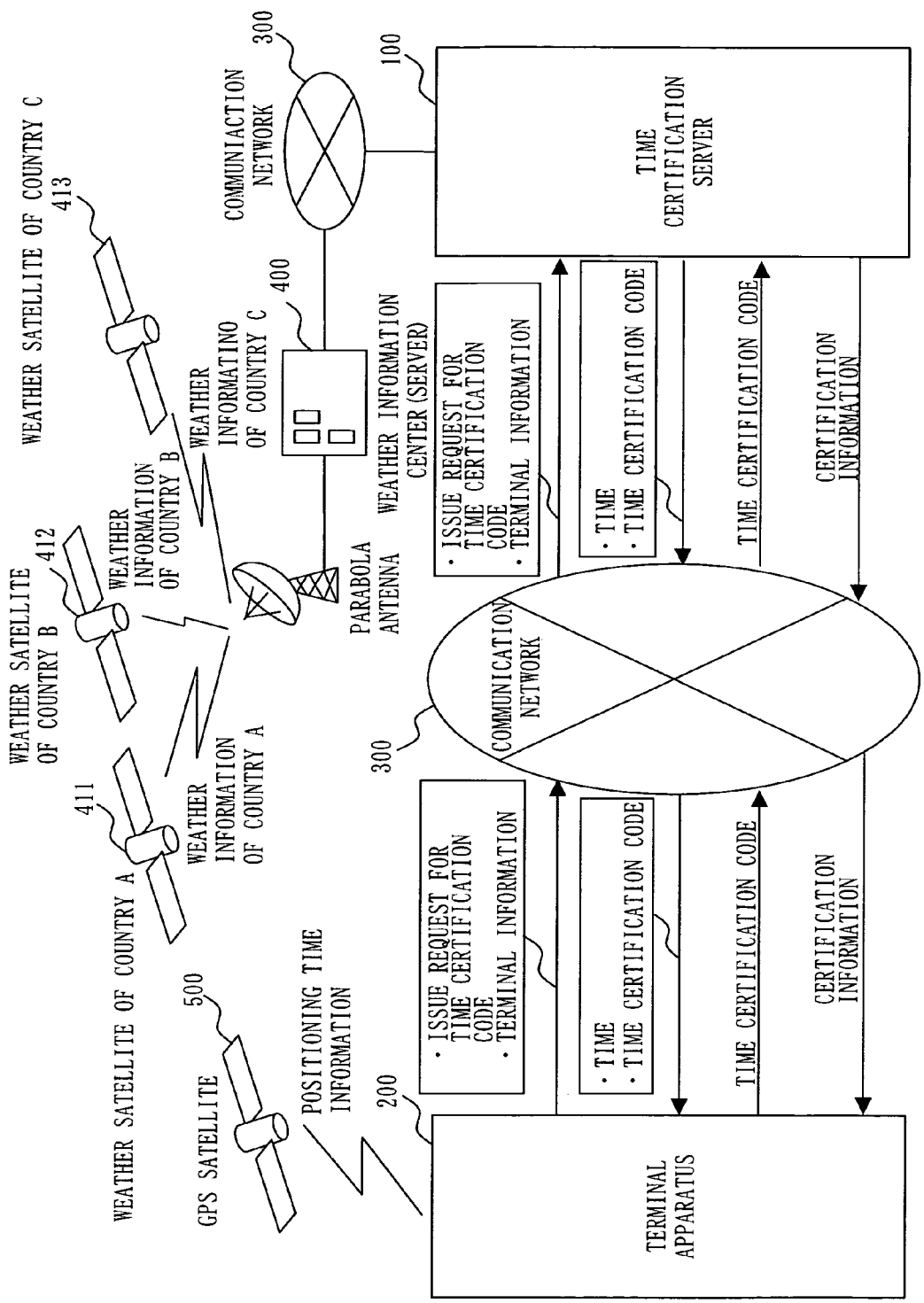
[FIG. 22] It is a diagram illustrating the configuration of a system that carries out time certification according to a fifth embodiment.

EXPLANATION OF REFERENCE NUMERALS 100 time certification server
101 receiving section
102 temporal change information input section
103 first code generating section
104 second code generating section
105 transmitting section
106 time certification code memory section
107 certification processing section
108 server electronic clock
109 certification time recording section
110 condition checking section 111 special code instruction section
112 inhibiting section
200 terminal apparatus
201 time certification code issue requesting section
202 stamping section
203 time certification code memory section
204 time verification section
205 positioning section
300 communication network
400 weather information center
401 weather satellite
500 GPS satellite
901 display unit
902 keyboard (K/B)
903 mouse
904 FDD
905 CDD
906 printer unit
907 scanner unit
911 CPU
912 bus
913 ROM
914 RAM
915 communication board
920 magnetic disc drive
921 OS
922 window system
923 program group
924 file group
931 telephone set
932 facsimile machine
940 the Internet
941 web server
942 LAN

The invention claimed is:

1. A time certification server, comprising:
   a receiving section configured to receive, from a terminal apparatus, an issue request for a time certification code and terminal information relating to the terminal apparatus, the terminal information including position of the terminal apparatus obtained by measuring a position of the terminal appartus;
   a temporal change information input section configured to input temporal change information;
   a first code generating section configured to generate a first code by perfoming a hash function on the temporal change information, output the first code;
   a second code generating section configured to generate a second code by perfoming a hash function on the received terminal information and the first code, and output section, and output the second code;
   a transmitting section configures to transmit to the terminal apparatus the second code as a time certification code;
   a time certification code memory section configured to store the time certification code in correlation with time; and
   a certification processing section configured to receive the time certification code from the terminal apparatus, search the time certification code memory section using the time certification code received, to obtain time correlating with the time certification code, and output certification information based on the time obtained to the terminal apparatus.

2. The time certification server of claim 1, wherein the temporal change information includes weather information, and
   the first code generating section is configured to the hash the temporal change information including the weather information to generate the first code.

3. The time certification server of claim 1, wherein the terminal information includes terminal identification information of the terminal apparatus, and
   the second code generating section is configured to hash the terminal information including the terminal identification information and the temporal change information, to generate the second code.

4. The time certification server of claim 1, wherein the terminal information includes location-dependent information unique to a location of the terminal apparatus, and
   the second code generating section is configured to hash the terminal information including the location-dependent information and the temporal change information to generate the second code.

5. The time certification server of claim 1, wherein the terminal information includes terminal positioning information obtained by a Global Positioning System (GPS) satellite used to measure a position of the terminal apparatus, and positioning time information acquired from a satellite electronic clock of the GPS satellite; and
   the time certification server further comprises:
   a server electronic clock synchronized with the satellite electronic clock of the GPS satellite; and
   a certification time recording section configured to store the positioning time information included in the terminal information and time information measured by the server electronic clock.

6. The time certification server of claim 1, wherein the terminal information includes a previously issued time certification code, the second code generating section is configured to generate the second code based on the terminal information including the time certification code and the temporal change information, and
   the transmitting section is configured to transmit to the terminal apparatus the second code output from the second code generating section as a new time certification code.

7. The time certification server of claim 6, wherein the time certification code memory section is configured to store the previously issued time certification code and the new time certification code in correlation with each other in a traceable manner, and the certification processing section, upon receipt of the time certification code from the terminal apparatus, retrieve from the time certification code memory section a time certification code that correlates with the time certification code received, and outputs to the terminal apparatus the certification information acquired from the time certification code retrieved.

8. The time certification server of claim 1, further comprising:
   a condition checking section configured to detect whether information acquired from the terminal information meets a predetermined condition, and
   a special code instruction section configured to instruct the second code generating section to add a special code indicating that the information acquired from the terminal information meets the predetermined condition when the condition checking section detects that the information acquired from the terminal information meets the predetermined condition.

9. The time certification server of claim 1, further comprising:

a condition checking section that detects whether information acquired from the terminal information meets a predetermined condition, and an inhibiting section configured to inhibit the second code generating section from generating the second code when the condition checking section detects that the information acquired from the terminal information acquired from the terminal information meets the predetermined condition.

10. The time certification server of claim 1, wherein the temporal change information input section is configured to be connected to a plurality of source devices, each providing the temporal change information, selects one of the plurality of source devices based on time.

11. The time certification server of claim 10, wherein the temporal change information input section is configured to select the one of the plurality of source devices at random.

12. A time certification method performed by a time certification system including a terminal apparatus and a time certification server, comprising:

transmitting, from the terminal apparatus, an issue request for a time certification code and terminal information relating to the terminal apparatus to the time certification server, the terminal information including position information of the terminal apparatus obtained by measuring a position of the terminal apparatus:

receiving, at the time certification server, the issue request for the time certification code and the terminal information relating to the terminal;

inputting, at the time certification server, temporal change information from a source device tha provides the temporal change information;

generating, at the time certification server, a first code by perfoming a hash function on the temporal change information, and outputting the first code;

generating, at the time certification server, a second code by perfoming a hash function on the terminal information and the first code, and outputting the second code;

transmitting, from the time certification server, the second code to the terminal apparatus as a time certification code;

storing, at the time certification server, the time certification code in a time certification code memory section in correlation with time;

transmitting, from the terminal apparatus, the time certification code to the time certification server and requesting time certification, receiving, at the time certification server, the time certification code from the terminal apparatus; and searching, at the time certification server, the time certification code memory section using the time certification code received to obtain time correlating with the time certification code, and outputting to the terminal apparatus the certification information based on the time obtained.

13. The time certification method of claim 12, wherein the terminal information includes a previously issued time certification code, and the time certification server inputs from the terminal apparatus the terminal information including the previously issued time certification code, generates the second code based on the terminal information including the time certification code and the temporal change information, and transmits the second code to the terminal apparatus as a new time certification code.

14. The time certification method of claim 13, wherein the time certification code memory section stores the previously issued time certification code and the new time certification code in correlation with each other in a traceable manner, and the time certification server, upon receipt of the time certification code from the terminal apparatus, retrieves from the certification server the time certification code printed by the stamping time certification code memory section a time certification code that correlates with the time certification code received sequentially, and outputs to the terminal apparatus certification information acquired drom the time certification code retrieved.

15. The time certification method of claim 12, wherein the temporal change information is provided from plurality of source devices, and the time certification server selects one of the plurality of source devices based on time.

16. A computer readable storage medium encoded with computer program instructions, which when executed by a computer, cause the computer to execute a method of time certification, comprising:

receiving from the terminal apparatus the issue request for the time certification code and terminal information relating to the terminal, the terminal information including position information of the terminal apparatus;

inputting temporal change information: provides the temporal change information;

generating a first code by performing a hash function on the temporal change information, and outputting the first code;

generating a second code by performing a hash function on the received terminal information and the first code and outputting the second code;

transmitting the second code to the terminal apparatus as a time certification code;

storing the time certification code in correlation with time;

receiving the time certification code from the terminal apparatus;

retrieving the stored time certification code;

acquiring time correlates with the time certification code; and outputting to the terminal apparatus certification information based on the time acquired.

* * * * *